(12) United States Patent
Bosma et al.

(10) Patent No.: US 7,278,116 B2
(45) Date of Patent: Oct. 2, 2007

(54) MODE SWITCHING FOR AD HOC CHECKBOX SELECTION

(75) Inventors: John Hans Handy Bosma, Cedar Park, TX (US); Keith Raymond Walker, Austin, TX (US); Yen-Fu Chen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 903 days.

(21) Appl. No.: 10/406,654

(22) Filed: Apr. 3, 2003

(65) Prior Publication Data
US 2004/0196316 A1    Oct. 7, 2004

(51) Int. Cl.
*G06F 3/00*    (2006.01)

(52) U.S. Cl. .................. 715/845; 715/769; 715/863; 715/856

(58) Field of Classification Search ................ 715/845, 715/769, 863, 856
See application file for complete search history.

(56) References Cited

U.S. PATENT DOCUMENTS

| | | | |
|---|---|---|---|
| 5,959,627 A | 9/1999 | Duwaer et al. | |
| 6,100,887 A * | 8/2000 | Bormann et al. | 715/764 |
| 6,104,398 A | 8/2000 | Cox, Jr. et al. | |
| 6,252,592 B1 | 6/2001 | King et al. | |
| 6,473,071 B2 * | 10/2002 | Liu | 345/168 |
| 6,535,229 B1 * | 3/2003 | Kraft | 715/764 |

* cited by examiner

*Primary Examiner*—Sy D. Luu
(74) *Attorney, Agent, or Firm*—John Biggers; David A Mims, Jr.; Biggers & Ohanian, LLP

(57) ABSTRACT

Controlling checkbox status by selecting and deselecting checkboxes in a GUI according to a mode of operation, the GUI having displayed upon it a set of checkboxes comprising a multiplicity of checkboxes, wherein each checkbox comprises a selection status indicating whether each checkbox is selected; detecting a mode selection event; and changing the mode of operation in dependence upon the detected mode selection event. In some exemplary embodiments each checkbox comprises a drag status and the method includes toggling the status of the first checkbox and statefully toggling the selection status of checkboxes experiencing drag event in dependence upon drag status, the new state of the first checkbox, and the original state of the current checkbox.

15 Claims, 15 Drawing Sheets

MODE SWITCHING FOR AD HOC CHECKBOX SELECTION

BACKGROUND OF THE INVENTION

1. Field of the Invention

The field of the invention is data processing, or, more specifically, methods, systems, and products for non-persistent, stateful ad hoc checkbox selection in graphical user interfaces.

2. Description of Related Art

The role of checkboxes in user interface design is problematic for users making ad hoc selections of computer data. The typical use of checkboxes is to allow users to select multiple items in a list. Prior to this invention, users generally selected multiple data items using checkboxes in one of several ways, including, for example: 'select all,' 'clear all,' 'toggle all,' 'click individual items,' and 'select all in a group.'

While each of these methods allows selection of multiple data items, each is problematic. Viewed from an efficiency perspective, selection is especially problematic in cases where users make ad hoc choices from a checkbox list. Consider the hypothetical example of a 100-item list, in which the user desires to select 57 of the items. The hypothetical list can be described as "ad hoc" in that no preexisting logical grouping is sufficient to allow selection of items with a single user action. To select the 57 items, a user could 'select all,' then clear 43 individual items by clicking each, resulting in a total of 44 clicks to select the 57 items. Or the user could select 43 items the user does not want, then 'toggle all,' thus selecting the preferred items, again with a total of 44 clicks. Alternatively, the user could click 57 items by single-clicking each item desired. If there is a 'select all in groups' available in the user's GUI, then the number of clicks is dependent on a predefined logical system. In any event, the user would not be able to select 57 ad hoc items with a single click-and-drag operation.

Ad hoc selection is important because users have their own reasons for selecting data in a list; their preferences cannot always be predicted. Moreover, in most cases user preferences in selecting should not be limited to predefined logical groupings. Any system that limits the user to preset groupings undermines the goal of allowing maximal user flexibility, which is the point of checkbox lists in the first place. While each of the above methods in combination allows for ad hoc selection, each is unable to provide an efficient means of selecting data in an ad hoc fashion.

The 'select all' option includes too many items when the user seeks to make ad hoc selections. Obviously, the 'clear all' option selects too few, since no selection is made. The 'toggle all' requires a number of individual clicks and is dependent on preexisting selections. Likewise, the 'click individual items' option requires individual clicks for each item.

The 'select all in group' option has its own inefficiencies. First, 'select all in group' requires development effort to determine preexisting groups of checkbox items. Second, regardless of how well the groups are formulated, ad hoc selection still requires single clicking after a group is selected. That is, the 'select all in group' option provides access to structured means for selection of data, which is the opposite of ad hoc selection. While the 'select all in group' option could shorten the number of clicks to make a particular set of ad hoc selections, that is not its purpose. Moreover, selecting by group can in some cases actually increase the number of clicks required to choose ad hoc items, depending on how closely the groups mirror the choices intended by the user.

Some attempts have been made to deal with these efficiency problems. For example, the invention described in IBM's U.S. Pat. No. 6,104,398, "Fast and efficient means for grouped object selection and deselection," attempts to overcome inefficiencies in item lists requiring users to select or deselect individual items. The '398 patent proposed a means for aggregating checkbox and other data items into predetermined groups so that a single operation could select multiple items. While this was a useful step forward, the method of the '398 patent required such groupings to be determined on a predefined basis. The problem of ad hoc selection of both contiguous and non-contiguous data in a list remained to be solved. Moreover, the method of the '398 patent required the instantiation of new controls external to the checkbox list itself, or in the alternative that some checkboxes control others, thus expanding the number of items in a list. A method that constrained selection controls to the minimum necessary to complete the task was still needed.

The minimum number of selection controls needed to complete an ad hoc selection is equal to the number of items in a list. In other words, there is no need to instantiate controls external to a list if the list is to be chosen in an ad hoc fashion. Fundamentally, the problem with checkbox selection prior to this invention was in dealing with ad hoc selection of data. That is, in any list of computerized data relying on checkboxes, users may need to select both contiguous and non-contiguous data. To select on an ad hoc basis means either checking individual items or relying on groups structured in an a priori fashion. A system that addresses these problems should allow users to select among items with the minimum number of operations necessary. For the purpose of a checkbox list, that minimum number of operations to select one or more items on an ad hoc basis is a single click-and-drag operation.

Prior to this invention, no method has existed to allow for ad hoc selection of checkbox items with a single click-and-drag operation.

In fact, structured groupings substitute a priori judgments made by those who define the structure for judgments made by users, potentially imposing new inefficiencies. Selecting a structured group may require de-selection by the user. Ad hoc selection, then, does not imply a lack of structure in selections, although such may be the case, but instead that users impose their own structure on information. The user's definition of the user's intended list structure is generally by definition more efficient than judgments external to the user. It is effectively an unreliable accident if a predefined grouping aids ad hoc selection.

The present invention is a significant departure from previous approaches. For example, the "Official Guidelines for User Interface Developers and Designers" issued by Microsoft (Redmond, Wash.: Microsoft, 1999) specifies that checkbox controls are selected on an individual basis:

> "When the user clicks a checkbox with the primary mouse button, either in the checkbox or on its label, the checkbox is selected and its state is toggled. When the user presses the mouse button, the input focus moves to the control and the checkbox displays its pressed appearance. Like option buttons and other controls, if the user moves the pointer off the checkbox or its label while pressing the mouse button, the control's appearance returns to its original state and retains the input focus. The state of the checkbox does not change until the mouse button is released. To change a control's setting, the pointer must be over the checkbox or its label when the user releases the mouse button."

In summary, this means that for checkbox controls relying on mouse clicks, checkbox selection occurs on an individual basis. The user must click on each item s/he wishes to select; the state of selections is not transferred from one checkbox to another. If the mouse moves off the checkbox, the checkbox reverts to its original state and the user cannot continue to select by hovering over other checkbox items. The limitations of prior approaches, then, are traceable to their reliance on mouse clicks as such.

SUMMARY OF THE INVENTION

Exemplary embodiments of the invention include methods for control of checkbox status. Exemplary embodiments include selecting and deselecting checkboxes in a GUI according to a mode of operation, the GUI having displayed upon it a set of checkboxes including a multiplicity of checkboxes, in which each checkbox includes a selection status indicating whether each checkbox is selected. Such embodiments include detecting a mode selection event and changing the mode of operation in dependence upon the detected mode selection event.

In exemplary embodiments of the invention, selecting and deselecting checkboxes in a GUI according to a mode of operation includes detecting a touch event on a check box in the GUI, and toggling the status of the check box. Such embodiments repeatedly include, for a multiplicity of repetitions, detecting a drag event for each additional check box onto which a user drags the pointer, in which the user drags the pointer onto at least one additional check box, and toggling the status of each additional touch box for which a drag event is detected.

In exemplary embodiments of the invention, selecting and deselecting checkboxes in a GUI according to a mode of operation includes detecting a touch event on a first check box in the GUI, and toggling the status of the first check box to a new status. Such embodiments repeatedly include, for a multiplicity of repetitions, carrying out the steps of detecting a drag event for each additional check box onto which a user drags the pointer, in which the user drags the pointer onto at least one additional check box, and statefully toggling the status of each additional touch box for which a drag event is detected to the new status of the first check box.

In exemplary embodiments of the invention, selecting and deselecting checkboxes in a GUI according to a mode of operation includes detecting a touch event on a first checkbox in the GUI, storing the initial status of all checkboxes in the set, and toggling the status of the first checkbox to a new status. Such embodiments repeatedly include, for a multiplicity of repetitions, detecting a drag event for a checkbox onto which a user drags the pointer, comparing the initial status of the checkbox onto which a user drags the pointer and the new status of the first checkbox. In typical embodiments, if the stored initial status of a checkbox for which a drag event is detected is the same as the new status of the first checkbox, toggling the status of the checkbox for which a drag event is detected.

In exemplary embodiments of the invention, each checkbox includes a drag status indicating whether each checkbox has experienced a drag event. In such embodiments, selecting and deselecting checkboxes in a GUI according to a mode of operation includes detecting a touch event on a first checkbox in the GUI, toggling the status of the first checkbox to a new status, and setting the drag status of the first checkbox. Typical embodiments include detecting first drag events on additional checkboxes onto which a user drags the pointer, including setting a drag status of the additional checkboxes indicating that the additional checkboxes have experienced a drag event. Exemplary embodiments include statefully toggling, to the new selection status of the first checkbox, the status of the additional checkboxes, detecting subsequent drag events for additional checkboxes onto which a user drags the pointer more than once during a click-and-drag operation, including determining in dependence upon the drag statuses of the additional checkboxes whether the additional checkboxes have experienced a drag event, and statefully toggling the selection status for each additional checkbox for which a subsequent drag event is detected to the opposite of the selection status of such additional checkbox when the additional drag event is detected.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

Figure 1:
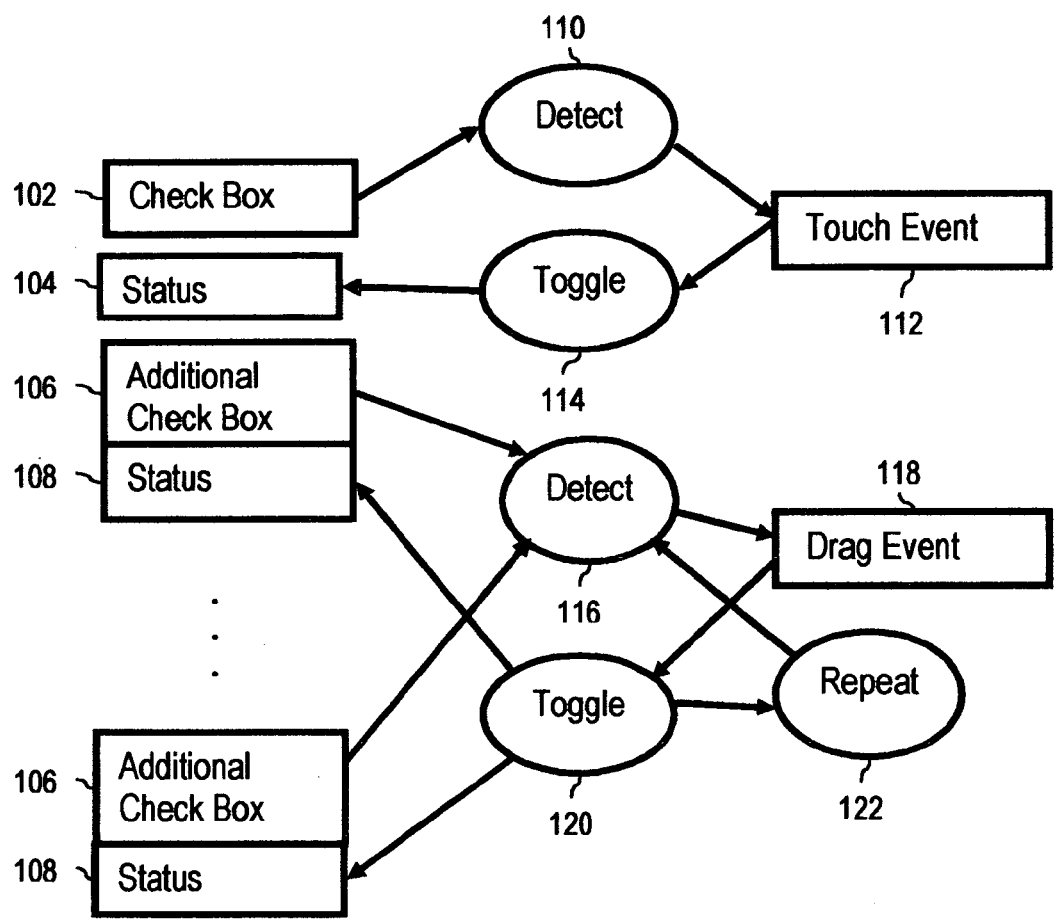
FIG. 1 is a control flow diagram illustrating typical exemplary embodiments of the present invention.

The present invention is described to a large extent in this specification in terms of methods for ad hoc checkbox selection in graphical user interfaces, particularly non-persistent, stateful ad hoc checkbox selection. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

"Drag" means moving a pointer on a GUI, by use of a pointing device, while the pointing device status is 'active.' In the case of mice, 'drag' means moving the mouse pointer with a mouse button held down, that is, while the mouse status is 'mouse down.' In the case of a stylus used with a pressure sensitive pad, 'drag' often means moving a pointer by pressing the stylus on the pad and moving the stylus while maintaining the pressure of the stylus on the pad.

"GUI" means graphical user interface.

"Pointer device" means any device coupled to a computer and having the capabilities of indicating pointer device status and moving a pointer displayed on a GUI on the computer. Examples of pointer devices useful with various embodiments of the invention include mice, fingers pressed upon touch sensitive screens, and styli pressed on touch sensitive pads. Other pointer devices will occur to those of skill in the art, and the use of all such pointer devices is well within the scope of the present invention. Pointer device statuses include a status of 'active.' One of the events that will toggle a checkbox occurs, for example, when a pointer device status is changed to 'active' while the pointer is on the checkbox. In the case of mice, 'active' status means 'mouse down' or 'mouse pressed.' Pointers moveable on GUIs, in the case of mice, include mouse pointers. In the case of a stylus used with a pressure sensitive pad, 'active' typically means that the stylus is pressed upon the pad. In this specification, because mice, mouseclicks, and mouse presses are so common as pointer devices and pointer operations in GUIs, the phrases "first clicked," "first pressed," and "first affected" are treated as synonymous.

"Pseudocode" is exemplary source code in a form similar to a programming language used for explanation in this disclosure. Pseudocode is not represented as conforming strictly to the requirements of any particular programming language, so that there is no representation that pseudocode examples from this disclosure will compile or execute. Pseudocode examples will, however, help with explanation so as to enable persons of skill in the art to make and use embodiments of the present invention.

"Select-and-drag" means activating a pointer device and dragging its pointer across a GUI display while holding it active. In the case of a mouse, select-and-drag is referred to as "click-and-drag." Because mice are so common in user interfaces, the term 'click-and-drag' is used often in this disclosure. Such usage is not intended in any way as limiting pointer devices to mice.

"Status" refers to selection status, an indication, generally comprising a computer memory variable, whether a checkbox is selected. Of course, "selection status" also refers to selection status. "Drag status" is an indication whether a checkbox has experienced a drag event "Stateful toggle" means a toggle of the status of a checkbox that is dependent upon a checkbox selection state or a checkbox drag state. In typical embodiments of the present invention, a "stateful toggle" is a toggle of a checkbox status effected through a select-and-drag operation of a pointer device.

"Persistent stateful toggle" refers to the fact that in some modes of exemplary embodiments of the present invention some checkbox states 'persist.' Upon experiencing a drag event of a pointer, some checkboxes do not toggle their states.

"Non-persistent stateful toggle" refers to the fact that in some modes of exemplary embodiments of the present invention checkbox selection states do not 'persist' across subsequent drag operations. Upon experiencing a subsequent drag event of a pointer, for example, checkboxes in such modes of embodiments of the present invention generally toggle their states. In addition, "non-persistent stateful toggle" implies a stateful toggle whose current selection status is amenable to change more than once during a single click-and-drag operation.

Ad Hoc Checkbox Selection

Embodiments of the present invention provide efficient selection and deselection of ad hoc data elements represented by checkboxes on a GUI form using a single click-and-drag operation. Embodiments of the present invention generally preserve the ability to select or deselect individual items in a data set by reference to the selection state of a preceding selection or a drag state of a current selection. This invention addresses many of the limitations of the prior art by utilizing mouse movement, not merely mouse clicks, as a means of controlling checkbox state.

Many embodiments of this invention address limitations of prior art, especially with respect to the prior art requirement for multiple touch events from a pointer device, such as mouseclicks from a mouse, by utilizing stateful preservation of the drag status of checkboxes in a set and of the new status of a first affected checkbox and affecting the state of other checkbox items via pointer movement in dependence upon those recorded statuses, that is, pointer movement as such, 'dragging,' rather than additional touch events or 'clicks.' Many embodiments of this invention generally address limitations of prior art by utilizing stateful preservation of the result of a single mouseclick along with drag state affected by pointer movement.

Typical embodiments of the present invention also support multiple modes of operation, that is, multiple modes of selection and deselection of data elements. The modes are defined generally with respect to whether their operations are stateful or persistent. For purposes of explanation, four modes are described, although the number four is not a limitation, and the use of any number of modes of operation as will occur to those of skill in the art is well within the scope of the present invention. The four modes described in this disclosure are: Ad Hoc, Stateful Ad Hoc, Persistent Stateful Ad Hoc, and Non-Persistent Stateful Ad Hoc. References to the mode are sometimes abbreviated respectively as 'AH,' 'SAH,' 'PSAH,' and 'NPSAH.'

In many embodiments of the present invention, detecting a touch event comprises changing a pointer device status to 'active' while a pointer for the device is positioned on the checkbox. Pointer device statuses typically include a status of 'active.' One of the events that often toggles a checkbox occurs, for example, when a pointer device status is changed to 'active' while a pointer is on the checkbox. Pointer devices include, for example, a mouse, a stylus pressed upon a touch sensitive pad, and a finger pressed upon a touch sensitive screen. In the case of mice, 'active' status means 'mouse button down' or 'mouse pressed.' In the case of a stylus used with a pressure sensitive pad, 'active' often means that the stylus is pressed upon the pad. Because of its ubiquitous use as a pointer device, this specification often discusses examples in terms of mice and mouseclicks. No limitation is intended of pointer devices to mice or touch events to mouseclicks or mouse presses. As will occur to those of skill in the art, many implementations of pointer devices other than mice are well within the scope of this invention.

Consider the example of a user whose interface relies on a primary mouse button setup. When a user clicks on an initial checkbox item in a set of checkboxes, referred to as the "first affected checkbox," the "first clicked checkbox," or simply as the "first checkbox," that checkbox is selected or deselected depending on the previous selection state of the first affected checkbox, resulting in a new selection state of the first affected checkbox. This kind of status change, simply from an initial state to another state, is referred to as a "toggle." The new selection state of the first checkbox typically is recorded and retained.

Unlike prior art checkbox sets, however, in this example, when the user drags outside of the first affected checkbox, the first affected checkbox retains its new selection state. The user then drags the mouse pointer over additional checkboxes in the set. Checkboxes selected by dragging the mouse pointer have their selection states toggled or not toggled according to the current mode of operation, AH, SAH, and so on. In many embodiments of the present invention, a user can change modes of operation during operation by use of a single keystroke.

The first affected checkbox typically is included in modes of selection and deselection according to embodiments of the present invention. That is, the new state of the first affected checkbox is recorded, and on subsequent drag operations in the first affected checkbox, its status is toggled or not toggled according to the mode of operation, just as the status of other checkboxes is toggled in subsequent drag operations.

If the user wished to omit items from selection by dragging of the mouse pointer, in typical operation of most embodiments of the present invention, the user simply drags the mouse past or outside the checkboxes for the items to be omitted from selection by the dragging of the mouse pointer. In a checkbox list arranged vertically, for example, the user would drag the mouse pointer past the items by moving the pointer to the left or right and then up or down, so as to bypass checkboxes not to be selected.

A release of the primary mouse button, in typical modes of operation of many embodiments of the present invention, discontinues a click-and-drag operation. A click of the primary mouse button on another checkbox in the set reinitiates the process, thus allowing for continued toggling of additional checkboxes, stateful or non-stateful, persistent or non-persistent. The invention thus reduces the number of operations required to make ad hoc selections from a checkbox list to a theoretical minimum, that is, one click to effect a first selection (or first deselection) and one drag in a single continuing click-and-drag for each additional selection or deselection.

Turning now to FIG. 1, a first exemplary mode of operation for an embodiment of the present invention is seen illustrated as a method for ad hoc toggling of checkbox status. That is, the method of FIG. 1 illustrates the mode of operation referred to in this disclosure as 'Ad Hoc' or 'AH.' The method of FIG. 1 includes detecting (110) a touch event on a checkbox (102) and toggling (114) the status (104) of the checkbox. In many embodiments, a touch event is a mouse press on a checkbox. The method of FIG. 1 also includes repeatedly (122), for a multiplicity of repetitions, detecting (116) a drag event (118) for each additional checkbox (106) onto which a user drags a pointer, wherein the user drags the pointer onto at least one additional checkbox, and toggling (120) the status (108) of each additional touch box for which a drag event is detected. In many embodiments, a drag event is a mouse drag onto a checkbox in a GUI.

Typical embodiments of the invention are implemented as software programs installed and operating on computers comprising computer processors coupled to computer memory. Embodiments typically include computer displays which in turn further comprises graphical user interfaces or "GUIs." Typical exemplary embodiments are implemented on or within GUIs, where the GUIs are operated by a user using a pointing device, the pointing device having a capability of indicating a touch on a checkbox, the pointing device having associated with it through the GUI a pointer displayed upon the GUI and responsive to physical motion of the pointing device. In this sense, in typical example embodiments, a "pointer" is a graphical analog of a pointer device, the pointer being displayed on a display screen with a GUI display object, such as a GUI window or dialog box, the pointer moving upon the display in dependence upon a user's physical movement of a corresponding pointer device. In the example of a mouse, the mouse pointer moves on a display screen as a user moves the mouse on a mouse pad.

In typical example embodiments of the present invention, a GUI has displayed upon it a set of checkboxes comprising a multiplicity of checkboxes, wherein each checkbox has a status comprising an indication whether a checkbox is selected. That is, checkboxes typically have at least the two statuses 'selected' and 'not selected.' Checkboxes having the status 'not selected' are sometimes referred to in this disclosure as 'deselected.'

Figure 2:
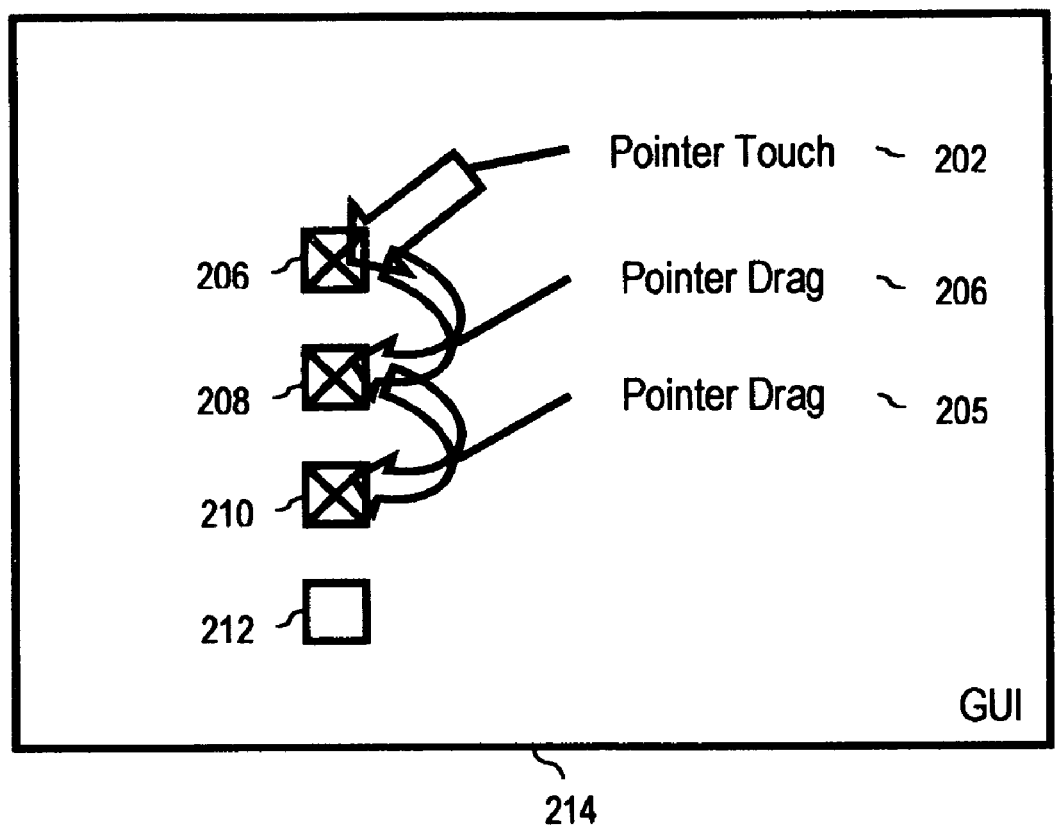
FIG. 2 is a diagram of events in a graphical user interface illustrating operation of typical exemplary embodiments of the present invention.

FIG. 2 illustrates a further example of the Ad Hoc mode of operation. The status of the checkboxes FIG. 2 are illustrated with 'Xs.' Selected checkboxes are illustrated with Xs, as those at references 206, 208, and 210 in FIG. 2. Deselected checkboxes are illustrated without Xs, as the checkbox at reference (212).

The checkboxes in FIG. 2 began the illustrative process deselected. In the process illustrated in FIG. 2, a pointer touch event (202), such as a mouse down event on checkbox (206) has been detected and the status of checkbox (206) has been toggled from 'not selected' to 'selected,' as indicated by the 'X' in checkbox (206). Further in the process illustrated in FIG. 2, a pointer drag event (204), such as, for example, a mouse drag from checkbox (206) to checkbox (208) has been detected and the status of checkbox (208) has been toggled from 'not selected' to 'selected,' as indicated by the 'X' in checkbox (208). Still further in the process illustrated in FIG. 2, a further pointer drag event (205), such as, for example, a mouse drag from checkbox (208) to checkbox (210) has been detected and the status of checkbox (210) has been toggled from 'not selected' to 'selected,' as indicated by the 'X' in checkbox (210).

The example of FIG. 2 illustrates the repetitive quality of the Ad Hoc mode in that additional checkbox statuses are toggled as a pointer is dragged repeatedly from checkbox to checkbox. FIG. 2 also illustrates that the status of a checkbox (212) is unaffected if no pointer event is detected for that checkbox. That is, neither a mouse down event nor a mouse drag event is detected for checkbox (212) in the example embodiment of FIG. 2, and the status of checkbox (212) therefore remains as it was at the beginning of the illustrative process, 'not selected.'

Figure 3:
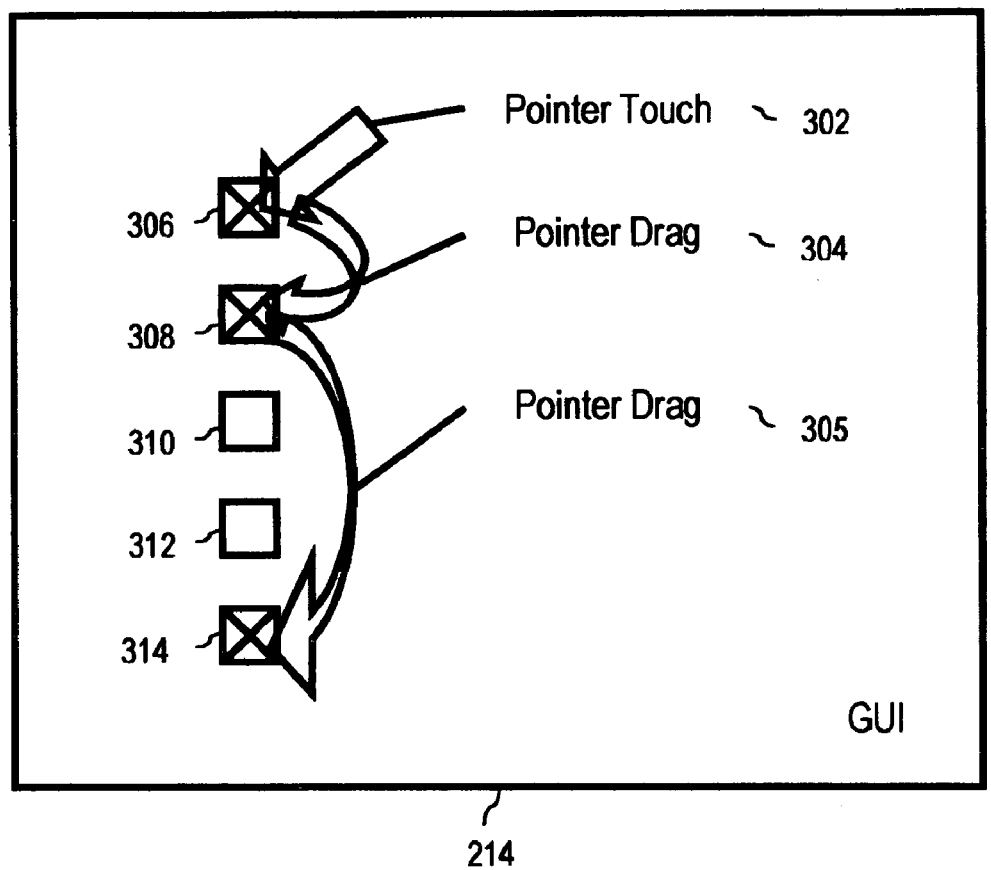
FIG. 3 is a further diagram of events in a graphical user interface illustrating operation of typical exemplary embodiments of the present invention.

A still further example embodiment of the Ad Hoc mode is illustrated in FIG. 3. Like the process illustrated in FIG. 2, the example process illustrated in FIG. 3 includes repeated drag events (304, 305). In the example of FIG. 3, however, for at least a portion of the repetitions, one or more further checkboxes (310, 312) are positioned upon the display screen in the GUI (214) between two of the additional checkboxes (308, 312), wherein a path (304) along which the pointer drags between the two additional checkboxes lies outside the further checkboxes, whereby the statuses of the further checkboxes remain unaffected.

More specifically, the checkboxes in the example embodiment of FIG. 3 began the illustrative process deselected. In the process illustrated in FIG. 3, a pointer touch event (302), such as a mouse down event on checkbox (306) has been detected and the status of checkbox (306) has been toggled from 'not selected' to 'selected,' as indicated by the 'X' in checkbox (306). Further in the exemplary process illustrated in FIG. 3, a pointer drag event (304), such as, for example, a mouse drag from checkbox (306) to checkbox (308) has been detected and the status of checkbox (308) has been toggled from 'not selected' to 'selected,' as indicated by the 'X' in checkbox (308). Still further in the process illustrated in FIG. 3, a further pointer drag event (305), such as, for example, a mouse drag from checkbox (308) to checkbox (314) has been detected and the status of checkbox (314) has been toggled from 'not selected' to 'selected,' as indicated by the 'X' in checkbox (314).

The example of FIG. 3 also illustrates the repetitive quality of the Ad Hoc mode in that additional checkbox statuses are toggled as a pointer is dragged repeatedly from checkbox to checkbox. FIG. 3 also illustrates that statuses of checkboxes (310, 312) are unaffected if no pointer event is detected for them. That is, neither a mouse down event nor a mouse drag event is detected for checkboxes (310) and (312) in the example embodiment of FIG. 3, and the status of checkboxes (310) and (312) therefore remains as it was at the beginning of the illustrative process, 'not selected.'

In the example of FIG. 2, no drag event was detected for checkbox (212) because in the repetitive dragging of the pointer from checkbox (206) to checkbox (210), the pointer never reached checkbox (212). In the example of FIG. 3, no drag event was detected for checkboxes (310) and (312) because in dragging the pointer from checkbox (308) to checkbox (314), the pointer was dragged around checkboxes (310) and (312) without touching them or passing over them. FIGS. 2 and 3 taken together illustrate an important advantage of the Ad Hoc mode in the present invention in that checkbox statuses are toggled in a completely ad hoc fashion just as fast as a user can think and move a pointer across a GUI display, toggling some checkboxes by passing a pointer over them, leaving others unaffected by moving the pointer around them without passing over them.

It is useful to remember also that toggle functions work both ways. The illustrations of FIGS. 2 and 3 show checkbox statuses toggled from 'not selected' to 'selected.' Touch and drag events in embodiments of the present invention, however, also toggle statuses from 'selected' to 'not selected.' A user, upon realizing a mistake or changing her mind, merely drags back across a previous toggled checkbox to again toggle its status back to an earlier status, a factor that once again illustrates the usefulness of this mode of operation, that a user can arrange ad hoc checkbox selections in any way desired as fast as the user can move a pointer.

A listing of exemplary pseudocode, helpful in explaining exemplary embodiments of the present invention, is set forth at the end of this specification in a Computer Program Listing Appendix. The Computer Program Listing Appendix is referred to in this specification as "the Appendix." References to 'Line' or 'Lines' in this specification are references to line numbers identifying lines of pseudocode in the Appendix, as in (Line 23) or (Lines 40-47).

The Appendix presents four pseudocode classes. The aCheckBox class extends Java's JCheckBox class with member data elements and accessor methods for a checkbox's drag status and initial state so that checkboxes themselves can be used to track such information. The CheckBoxDemo class (Line 14) provides methods that construct demonstrative checkboxes, construct and register event listeners, and create and make visible a display window for the checkboxes. The CheckBoxListener class is registered as a mouse listener with each checkbox and provides member methods that select and deselect checkboxes according to a current mode of operation in response to mouse presses and mouse drags on checkboxes. The KeyChoiceListener is registered as a key listener with each checkbox and provides a member method that changes the current mode of operation in dependence upon a detected mode selection event, which in this example is a keypress.

The pseudocode listing in the Appendix includes import statements (Lines 6-8) for Java classes that implement GUI elements and classes for listening for GUI events. The pseudocode example also provides for extensions of standard interface capabilities by adding capabilities for checkboxes to listen for mouse events, selecting and deselecting checkboxes, and communicating checkbox status to other application elements. Using Java AWT and Swing classes, for example, checkbox statements for extension capabilities create objects in background. Actual instantiations are accomplished in the example pseudocode, as in typical Java applications, by implementation methods such as those in the public class CheckBoxDemo statements.

More particularly, the constructor CheckBoxDemo( ) creates four checkboxes (Lines 32-35). The number of checkboxes is a number selected for explanation, not a limitation of the invention. Various embodiments of the invention use any number of checkboxes. The constructor CheckBoxDemo( ) also creates a checkbox listener and registers the checkbox listener with each checkbox (Lines 42-46). The checkbox listener class CheckBoxListener is fashioned from the standard Java class MouseInputAdapter which in turn implements the standard interface MouseInputListener which in turn implements the Java interface MouseListener. The checkboxes themselves are extensions of the Java standard swing class JCheckBox (Lines 14-20 and therefore contain member methods named addMouseListener( ), the method used at Lines 43-46 to register the checkbox listener with the checkboxes. The constructor CheckBoxDemo( ) also creates a key listener and registers the key listener with each checkbox (Lines 54-57). The constructor CheckBoxDemo( ) at Lines 60-66, together with the main( ) method for the CheckBoxDemo class at Lines 72-82, place the checkboxes in a GUI panel, place the GUI panel in a window, and display the window.

The CheckBoxListener class provides storage for the current mode of operation (Line 95), the mouse press status (Line 98), an indication whether a mouse has been dragged onto a checkbox and remains there (Line 102), a reference to a checkbox originating a current event (Line 104), a reference to a first affected checkbox in a click-and-drag event (Line 107), the original state of a first affected checkbox in a click-and-drag event (Line 110), the new state of a first affected checkbox in a click-and-drag event (Line 113), and the original states of all checkboxes, to be stored at the beginning of a click-and-drag event (Lines 116-119).

The CheckBoxListener class in this example inventively overrides four standard Java interface classes: MousePressed( ), MouseEntered( ), MouseExited( ), and MouseReleased( ). Each interface method is called by a checkbox when the checkbox experiences an event of interest, mouse pressed, mouse entered, and so on. Each interface method is passed an event object comprising data pertinent to the event of interest. Each interface method is overridden to perform functions useful in selecting and deselecting checkboxes according to a mode of operation in exemplary embodiments of the present invention.

The interface method MousePressed( ), at Lines 122-136, is overridden to:

Set the current mode of operation as a default with "currentMode='AH'". In this example, the default mode is hard coded for purposes of explanation, not as a limitation of the invention. A default mode can be set from a file of setup parameters, prompted for, or set in other ways as will occur to those of skill in the art.

Set the mouse pressed state variable to 'true' with "mousePressed=true;".

Retrieve a reference to the checkbox that experienced a mouse press event with "firstBox=(aCheckBox) me.getSource( );".

Retrieve and store the original state of the first affected box with "originalStateFirstBox=firstBox.getSelected( );".

Retrieve and store the initial state of all checkboxes with the four Lines 129-132:
boxOne.setInitialState(boxOne.isSelected( ));
boxTwo.setInitialState(boxTwo.isSelected( ));
boxThree.setInitialState(boxThree.isSelected( ));
boxFour.setInitialState(boxFour.isSelected( ));

Toggle the state of the first affected checkbox and store its new state with "newStateFirstBox=toggleBox(firstBox);".

Set the drag state of the first affected checkbox with "firstBox.setDragStatus(true);".

The interface method MouseEntered( ), at Lines 140-151, is overridden to:

Function only when the mouse is still pressed during a single click-and-drag, with "if(mousePressed)".

Set an indicator that the mouse has been dragged onto a checkbox and remains there with "mouseInBox=true;", an indicator useful later in changing modes.

Retrieve and store a reference to the current checkbox onto which the mouse has just been dragged with "sourceBox=(aCheckBox) me.getSource( );"

Select or deselect the current checkbox according to the current mode of operation with the switch( ) statement:

```
switch (currentMode) {
    Case "AH": toggleAHBox(sourceBox); break;
    Case "SAH": toggleSAHBox ( sourceBox); break;
    Case "PSAH":togglePSAHBox(sourceBox); break;
    Case "NPSAH": toggleNPSAHBox(sourceBox); break:
} // end switch( )
```

The interface method MouseExited( ) (Line 154) is overridden to record the fact that a mouse has exited a current checkbox with "mouseInBox=false;". And the interface method MouseReleased( ) (Line 157) is overridden to record the fact that a mouse press has been released with "mousePressed=false;".

In addition to the four public interface methods just described, CheckBoxListener also provides five private methods for selecting and deselecting checkboxes according to modes of operation in embodiments of the present invention:

toggleBox( ), at Lines 161-171, a generic status toggling method that retrieves the current state of a checkbox and reverses it, returning the new state value.

toggleAHBox( ), at Lines 176-178, a method that selects and deselects checkboxes according to the Ad Hoc mode of operation.

toggleSAHBox( ), at Lines 184-186, a method that selects and deselects checkboxes according to the Stateful Ad Hoc mode of operation.

togglePSAHBox( ), at Lines 192-196, a method that selects and deselects checkboxes according to the Persistent Stateful Ad Hoc mode of operation.

toggleNPSAHBox( ), at Lines 204-217, a method that selects and deselects checkboxes according to the Non-Persistent Stateful Ad Hoc mode of operation.

The extended capabilities illustrated in the pseudocode include listeners for mouse press and mouse drag sequences or events that enable selecting and deselecting ("toggling") checkboxes according to the current mode of operations when a user drags a pressed mousebutton or pointer over a checkbox. Even more specifically, the exemplary pseudocode implements these capabilities: An embodiment according to the pseudocode example creates and names checkboxes and places them in a set. Such an embodiment also implements capabilities for each checkbox to listen to mouse events such as 'mouse key is pressed,' 'mouse pointer is dragged,' and so on, and identify a checkbox as a source for such mouse events. Such an embodiment also has checkbox status toggling such that, after an initial mouse press for a pointer over a checkbox, subsequent dragging over checkboxes toggles the status of those checkboxes according to a current mode of operation. On an initial mouse press according to the pseudocode example, the source checkbox for the mouse press is toggled, referring to the 'first' checkbox or the 'first affected checkbox,' default mode is established, the fact that the mouse is pressed is recorded, the original state of the first box is recorded, the original state of all boxes is recorded, the state of the first box is toggled, and the new state of the first box is recorded. On a subsequent mouse drag and entry over a checkbox, the checkbox dragged over is toggled according to a mode of operation. If a checkbox has already been dragged over but the mouse button has not been released, subsequent drag and entry over the same checkbox in a single user motion may again toggle that checkbox according to the mode of operation. As explained below, a user can change modes when the mouse is pressed and in a box. If a user changes modes without releasing the mouse, operation continues according to a newly selected mode. Releasing the mouse ends the sequence.

Stateful Ad Hoc Checkbox Selection

For explanation of the Stateful Ad Hoc mode of operations, consider the example of a user whose interface relies on a primary mouse button setup. When a user clicks on an initial checkbox item in a list, that item is selected or deselected depending on the previous state of the item, resulting in a new state of the initial checkbox. When the user drags outside of the initial checkbox in an embodiment of the present invention, the initial checkbox typically remains selected. The user then drags the mouse pointer over additional checkbox items. Those items selected by dragging the mouse pointer have their states changed to the new state of the initial checkbox. Those items selected by dragging the mouse pointer whose states are already the same as the new state of the initial checkbox are unaffected.

Figure 4:
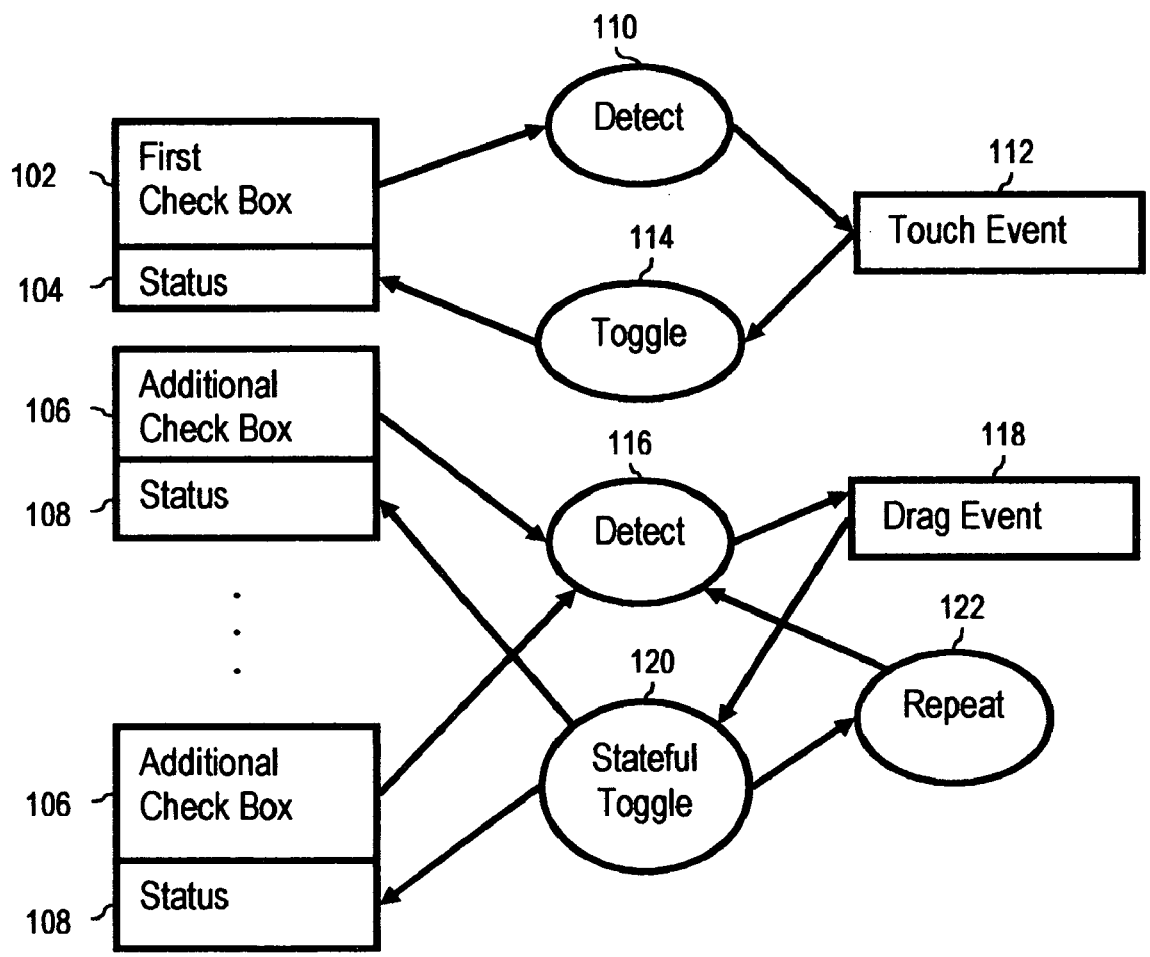
FIG. 4 is a control flow diagram illustrating typical exemplary embodiments of the present invention.

Turning now to FIG. 4, an example of the State Ad Hoc ('SAH') mode of operation is seen illustrated as a method for stateful toggling of checkbox status. The example embodiment of FIG. 4 includes detecting (110) a touch event on a first checkbox (102) and toggling (114) the status (104) of the checkbox. The touch event can be, for example, a mouse press. The example embodiment of FIG. 4 also includes repeatedly (122), for a multiplicity of repetitions, detecting (116) a drag event (118) for each additional checkbox (106) onto which a user drags a pointer, wherein the user drags the pointer onto at least one additional checkbox, and statefully toggling (120) the status (108) of each additional touch box for which a drag event is detected. The repeated drag events can be, for example, a mouse drag over a checkbox in a GUI.

Figure 5A:
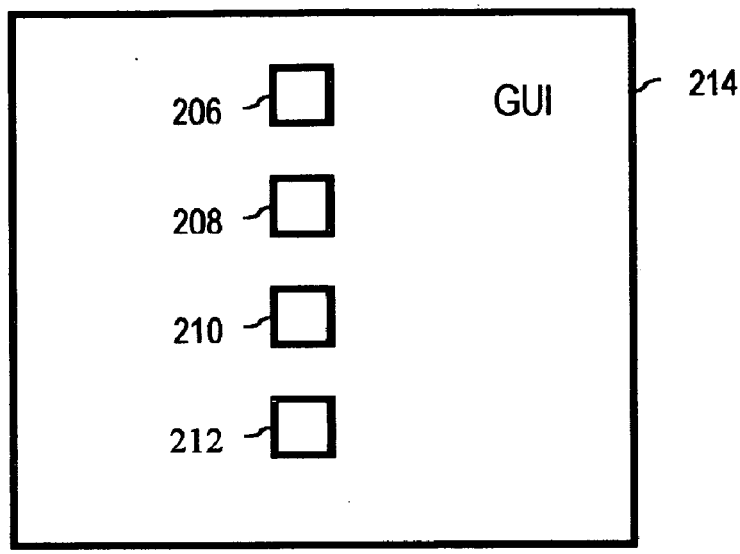
FIG. 5A illustrates initial statuses of checkboxes in a GUI prior to a click and drag event.
Figure 5B:
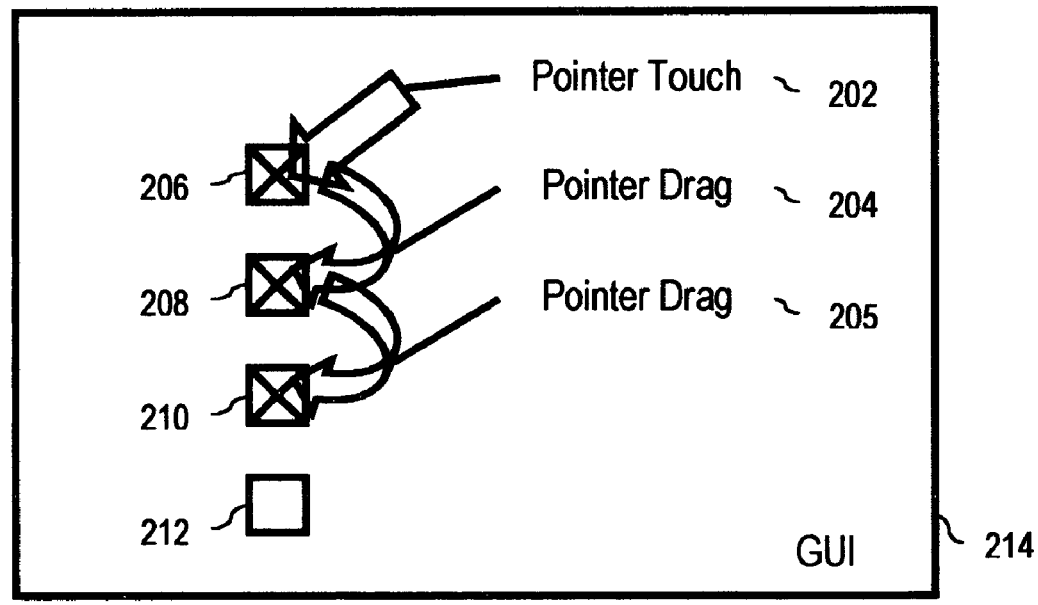
FIG. 5B is a diagram of click and drag events in a graphical user interface illustrating operation of typical exemplary embodiments of the present invention.

FIGS. 5A and 5B present further illustration of the Stateful Ad Hoc mode of operation in exemplary embodiments of the present invention. The status of the checkboxes in FIGS. 5A and 5B are illustrated with 'Xs.' Selected checkboxes are illustrated with Xs, as those at references 206, 208, and 210 in FIG. 5B. Deselected checkboxes are illustrated without Xs, as the checkbox at reference (212) in FIG. 5B and references (206), (208), (210), and (212) in FIG. 5A. FIG. 5A illustrates the initial statuses of checkboxes in a GUI prior to a click and drag event; FIG. 5B illustrates the results of a click and drag event on the statuses of the checkboxes whose initial statuses are shown in FIG. 5A.

The checkboxes in the example embodiment of FIG. 5B began the illustrative process deselected, as shown in FIG. 5A. In the process illustrated in FIG. 5B, a pointer touch event (202), such as a mouse down event, has been detected on first checkbox (206) and the status of first checkbox (206) has been toggled to a new status, from 'not selected' to 'selected,' as indicated by the 'X' in first checkbox (206). Further in the process illustrated in FIG. 5A, a pointer drag event (204) in the form of a mouse drag from checkbox (206) to checkbox (208) has been detected and the status of checkbox (208) has been statefully toggled from 'not selected' to 'selected' as indicated by the 'X' in checkbox (208). Still further in the process illustrated in FIG. 5A, a further pointer drag event (205) in the exemplary form of a mouse drag from checkbox (208) to checkbox (210) has been detected and the status of checkbox (210) has been statefully toggled from 'not selected' to 'selected,' as indicated by the 'X' in checkbox (210).

The status toggles for checkboxes (208) and (210) are said to be 'stateful toggles' because each was a change in status to 'selected,' the new status of the first checkbox (206). Had either of the checkboxes (208) or (210) already had the status 'selected' when the drag event for that checkbox was detected, then the stateful toggle would have had no effect on the status of that checkbox. In embodiments of this kind, Stateful Ad Hoc operation utilizing a mouse, the stateful toggle only changes statuses to the new status of the first checkbox affected by a click and drag event.

The example of FIG. 5A illustrates the repetitive quality of the Stateful Ad Hoc mode of operation in that additional checkbox statuses are statefully toggled as a pointer is dragged repeatedly from checkbox to checkbox. FIG. 5A also illustrates that the status of a checkbox (212) is unaffected in Stateful Ad Hoc mode if no pointer event is detected for that checkbox. That is, neither a mouse down event nor a mouse drag event is detected for checkbox (212) in the example embodiment of FIG. 2, and the status of checkbox (212) therefore remains as it was at the beginning of the illustrative process, 'not selected.'

Figure 6A:
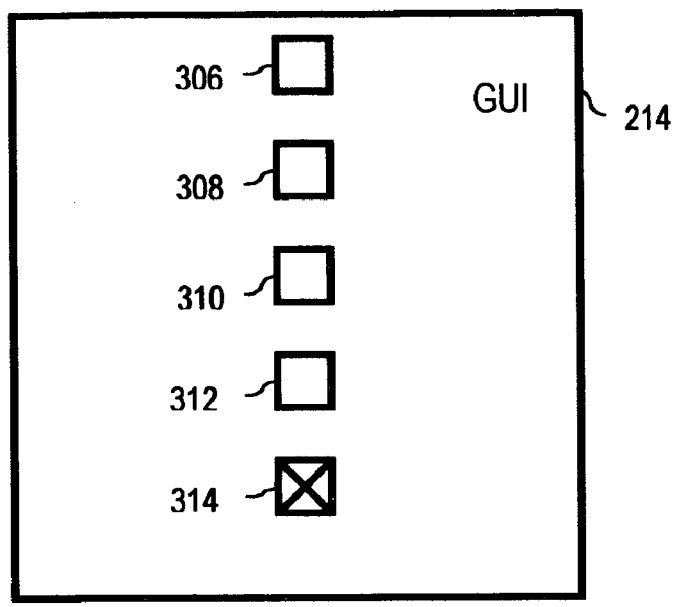
FIG. 6A illustrates initial statuses of checkboxes in a GUI prior to a click and drag event.
Figure 6B:
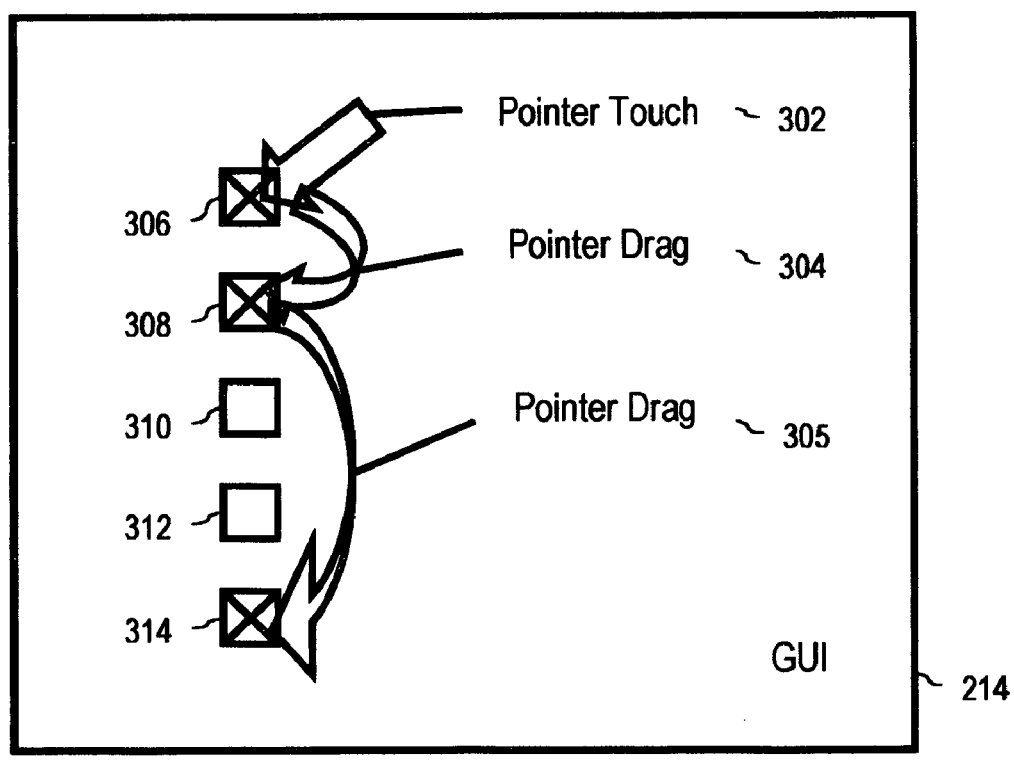
FIG. 6B is a further diagram of click and drag events in a graphical user interface illustrating operation of typical exemplary embodiments of the present invention.

A still further example of Stateful Ad Hoc mode is illustrated in FIGS. 6A and 6B. Like the process illustrated in FIG. 5A, the example process illustrated in FIG. 6A includes repeated drag events (304, 305). Like the initial statuses illustrated in FIG. 5A, the statuses illustrated in FIG. 6A show the initial statuses of checkboxes (306-314) prior to the execution of the click and drag process illustrated by FIG. 6B. In the example of FIG. 6A, however, for at least a portion of the repetitions, one or more further checkboxes (310, 312) are positioned upon the display screen in the GUI (214) between two of the additional checkboxes (308, 312), wherein a path (304) along which the pointer drags between the two additional checkboxes lies outside the further checkboxes, whereby the statuses of the further checkboxes remain unaffected.

More specifically, the checkboxes in the example embodiment of FIG. 6A began the illustrative process deselected, except for the checkbox (314), which, as shown in FIG. 6A, began the illustrative process selected. In the process illustrated in FIG. 6A, a pointer touch event (302) in the exemplary form of a mouse down event has been detected on first checkbox (306) and the status of first checkbox (306) has been toggled to a new status, from 'not selected' to 'selected,' as indicated by the 'X' in first checkbox (306).

Further in the exemplary process illustrated in FIG. 6B, a pointer drag event (304) in the exemplary form of a mouse drag from first checkbox (306) to checkbox (308) has been detected and the status of checkbox (308) has been statefully toggled from 'not selected' to 'selected,' as indicated by the 'X' in checkbox (308). Still further in the process illustrated in FIG. 3, a further pointer drag event (305), such as, for example, a mouse drag from checkbox (308) to checkbox (314) has been detected and the status of checkbox (314) has been statefully toggled to 'selected,' as indicated by the 'X' in checkbox (314). Because the toggle of checkbox (314) is a stateful toggle, the new status of the first checkbox (306) is 'selected,' and the initial status of checkbox (314) is 'selected,' the stateful toggle therefore has no effect on the status of checkbox (314), leaving the status of checkbox (314) 'selected.'

The example of FIG. 6B also illustrates the repetitive quality of typical embodiments of the present invention in that additional checkbox statuses are statefully toggled as a pointer is dragged repeatedly from checkbox to checkbox. FIG. 6B also illustrates that statuses of checkboxes (310, 312) are unaffected if no pointer event is detected for them. That is, neither a mouse down event nor a mouse drag event is detected for checkboxes (310) and (312) in the example embodiment of FIG. 6B, and the status of checkboxes (310) and (312) therefore remains as it was at the beginning of the illustrative process, 'not selected.'

In the example of FIG. 5B, no drag event was detected for checkbox (212) because in the repetitive dragging of the pointer from checkbox (206) to checkbox (210), the pointer never reached checkbox (212). In the example of FIG. 6B, no drag event was detected for checkboxes (310) and (312) because in dragging the pointer from checkbox (308) to checkbox (314), the pointer was dragged around checkboxes (310) and (312) without touching them or passing over them.

FIGS. 5B and 6B taken together illustrate an advantage of the Stateful Ad Hoc mode in that checkbox statuses are toggled and statefully toggled in a completely ad hoc fashion just as fast as a user can think and move a pointer across a GUI display, statefully toggling some checkboxes by passing a pointer over them, leaving others unaffected by moving the pointer around them without passing over them.

The illustrations of FIGS. 5B and 6B show checkbox statuses statefully toggled from 'not selected' to 'selected' because in each case the new status of the first checkbox was 'selected.' The fact that the new status of the first checkbox is 'selected' means that subsequent stateful toggles in Stateful Ad Hoc mode are to the 'selected' status. In many cases, however, a user may wish stateful toggles in Stateful Ad Hoc mode to result in deselection. In such cases, users select a first checkbox whose status is 'selected' so that upon detecting a mouseclick, the first checkbox will toggle to a new status of 'deselected,' and subsequent stateful toggles for other checkboxes are to the 'deselected' status. Alternatively, a user who wishes stateful toggles to result in deselection chooses a first checkbox whose status is 'deselected' and merely clicks it twice before dragging for stateful toggles. The first click toggles the status of the first checkbox to 'selected,' and the second click toggles the status of the first checkbox to the new status of 'deselected.' Subsequent stateful toggles will be to the 'deselected' status. The description of the alternative in this paragraph once again illustrate the usefulness of this invention: that a user can arrange stateful ad hoc checkbox selections in any way desired about as fast as the user can move a pointer.

The pseudocode listing in the Appendix illustrates one exemplary method of implementing the Stateful Ad Hoc mode of operation for selecting and deselecting GUI components, in this example, checkboxes. Remember that when a click-and-drag sequence begins operation on checkboxes of the exemplary pseudocode, the MousePressed( ) method records the new state of the first affected checkbox (Line 134). In this example, when a checkbox, during a ongoing click-and-drag sequence, experiences a mouse drag event, defined as a mouse entry to a checkbox with the mouse pressed, the MouseEntered( ) method (Lines 140-151), records that the mouse is in a checkbox (Line 142), retrieves a reference to the checkbox that reported the mouse entry (Line 143), and, assuming that the current mode is Stateful Ad Hoc mode ("SAH"), calls the member method toggleSAHBox(sourceBox), passing as a parameter the reference to the affected box (Line 146). ToggleSAHBox( ) then sets the state of the checkbox that just reported a mouse entry to the new state of the first checkbox of the present click-and-drag (Line 185). In typical embodiments of the present invention, implemented as illustrated in the pseudocode Appendix, the user controlling the mouse can change modes of operation any time the mouse pointer is over a checkbox. So long as the mouse is pressed and dragged from checkbox to checkbox in Stateful Ad Hoc mode, however, each checkbox entered will have its state set to the new state of the first checkbox in the sequence.

That is, in the Stateful Ad Hoc mode of operation, on an initial mouse press, the source checkbox for the mouse press is toggled. On a subsequent mouse drag and entry over a checkbox, the checkbox dragged over has its state changed to the new state of the first checkbox if its state is not already the new state of the first checkbox, that is, a stateful toggle. If a checkbox has already been dragged over but the mouse button has not been released, subsequent drag and entry over the same checkbox in a single user motion has no effect. Releasing the mouse button ends the sequence.

It is useful also to note that the pseudocode at Lines 184-186 represent only one way to implement the Stateful Ad Hoc mode of operation, although many ways will occur to those of skill in the art and all such ways are well within the scope of the present invention. Persons of skill in the art will recognize that toggleSAHBox( ) can also be coded as follows, for example, with the same effective functionality for Stateful Ad Hoc operation:

```
private void toggleSAHBox(sourceBox) {
    boolean sourceBoxState = sourceBox.isSelected( );
    if(sourceBoxState != newStateFirstBox)
        sourceBox.setSelected(newStateFirstBox);
}
```

In addition, along the same line of thought, although the pseudocode examples in the Appendix are generally in the form of Java, the use of Java is for explanation only, not a limitation of the invention. Methods for implementing modes of operation according to embodiments of the present invention can be implemented in many programming languages as will occur to those of skill in the art, including, for example, C++, Smalltalk, C, Visual Basic, and so on.

Persistent Stateful Ad Hoc Checkbox Selection

For explanation of the Persistent Stateful Ad Hoc mode of operations, consider the example of a user whose interface relies on a primary mouse button setup. When a user clicks on an initial checkbox item in a set of checkboxes, the "first affected checkbox" or the "first clicked checkbox," all of the statuses or states of the checkboxes in the set are recorded. The statuses so recorded are referred to in this specification as "initial statuses" or "initials states." When a user clicks on a first affected checkbox, that checkbox is selected or deselected depending on the previous state of the first affected checkbox, resulting in a new state of the first affected checkbox. That is, the state of the first affected checkbox is toggled.

When the user drags outside of the first affected checkbox in Persistent Stateful Ad Hoc mode, the first affected checkbox retains its new state. Then when the user drags the mouse pointer over additional checkboxes in the set, the checkboxes that experience mouse drags have their states toggled if their initial states at the time of the initial click on the first clicked checkbox are different from the new state of the first clicked checkbox.

The first affected checkbox typically is included in operations according to the Persistent Stateful Ad Hoc mode. That is, the initial state of the first affected checkbox is recorded upon detecting the first pointer event, the first mouseclick or mouse press, for example. Then the new state of the first affected checkbox is recorded, and on subsequent drag operations in the first affected checkbox, its status is toggled.

In typical embodiments, the status of the first affected checkbox is toggled upon subsequent drags in the first affected checkbox because the initial status of the first affected checkbox is not the same as the new status of the first affected checkbox. That the initial status of the first affected checkbox is not the same as the new status of the first affected checkbox is known as such because the new state of the first affected checkbox in typical embodiments is recorded after the status of the first affected checkbox is toggled, which in turn occurs after the initial status of the first affected checkbox is recorded. The initial status of the first affected checkbox therefore in Persistent Stateful Ad Hoc mode is not the same as the new status of the first affected checkbox, making the first affected checkbox a checkbox whose status is toggled by subsequent drag events in embodiments of the present invention.

If the user wished to omit items from selection by dragging of the mouse pointer, in typical operation of the Persistent Stateful Ad Hoc mode, the user simply drags the mouse past or outside the checkboxes for the items to be omitted from selection by the dragging of the mouse pointer. In a checkbox list arranged vertically, for example, the user would drag the mouse pointer past the items by moving the pointer to the left or right and then up or down, so as to bypass checkboxes not to be selected.

Figure 7:
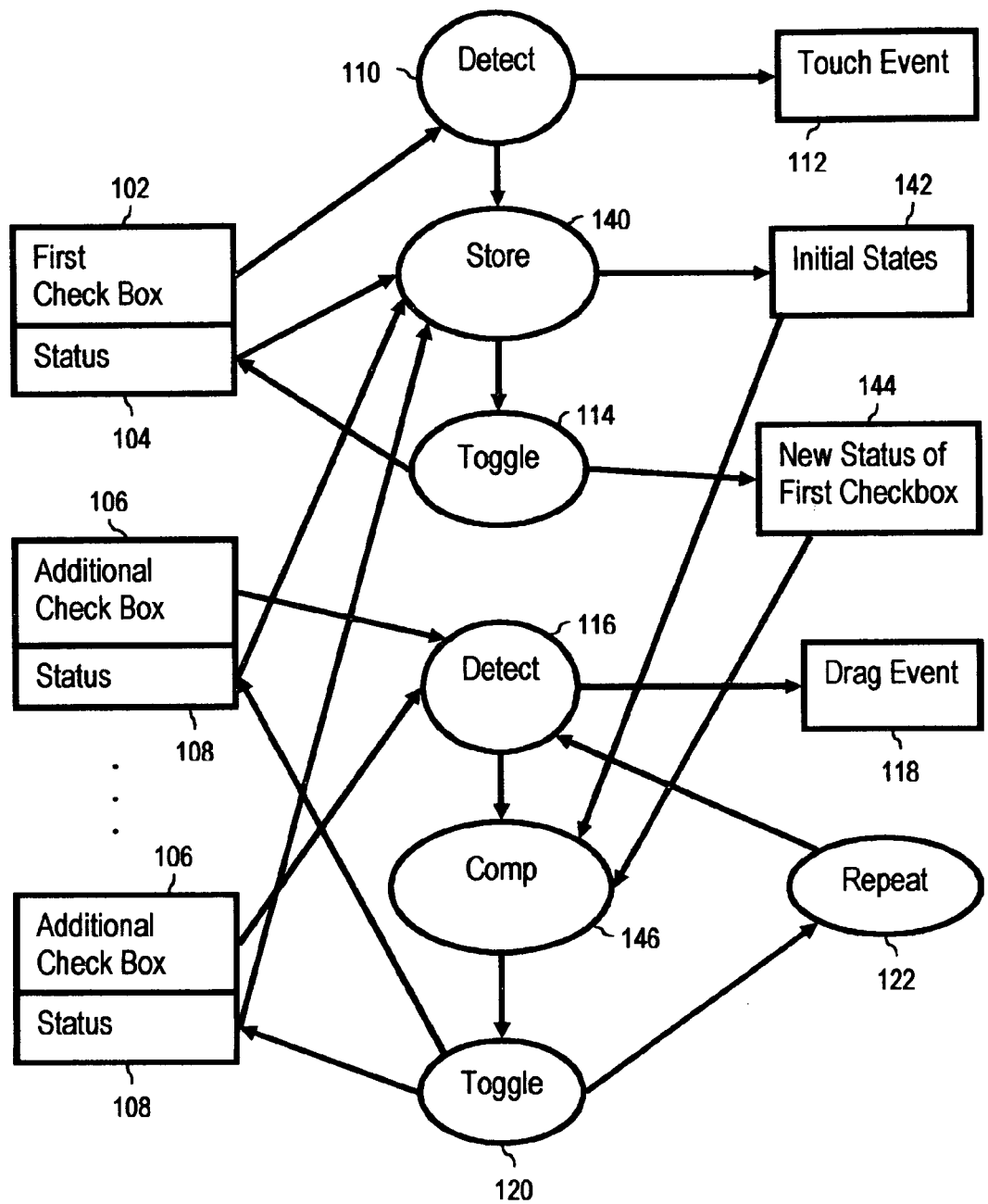
FIG. 7 is a control flow diagram illustrating typical exemplary embodiments of the present invention.

Turning now to FIG. 7, an example of the Persistent Stateful Ad Hoc mode is seen illustrated as a method for persistent stateful toggling of checkbox status applied to a set of checkboxes (102, 106). The method of FIG. 7 includes detecting (110) a touch event on a first checkbox (102), storing (140) the initial states of all checkboxes in the set (142), and toggling (114) the status (104) of the checkbox to a new status (144). A touch event can be, for example, a mouse press. The method of FIG. 7 includes repeatedly (122), for a multiplicity of repetitions, detecting (116) a drag event (118) for a checkbox (106) onto which a user drags a pointer, such as, for example, a mouse pointer, where the user typically drags the pointer onto at least one checkbox, comparing (146) the initial status (142) of the checkbox onto which a user drags the pointer and the new status of the first checkbox (144), and, if the initial status of a checkbox (142) for which a drag event is detected is the same as the new status of the first checkbox (144), toggling (120) the status (104, 108) of the checkbox for which a drag event is detected.

Except for the fact that it is the first affected checkbox (102), that is, the checkbox upon which an initiating touch event is detected, there is no difference between the first checkbox (102) and the other checkboxes (106) in typical operation of Persistent Stateful Ad Hoc mode. The first checkbox (102) is numbered differently from the other checkboxes (106) in FIG. 7 only for convenient reference to the fact that it happens to be the checkbox that experiences the initiating touch event. Any checkbox in the set is eligible to be the first checkbox, selected arbitrarily by an initiating touch event on any checkbox. In this sense, "initiating touch event" means the touch event that begins operation of the method in a particular embodiment, such as, for example, a user's moving a mouse pointer onto a checkbox, any checkbox in the set, and pressing a mouse button. That checkbox, regardless of which one it is within the set, is referred to in this specification as 'the first checkbox' or 'the first affected checkbox.'

With respect to drag events in particular, the operation of all checkboxes is typically the same in Persistent Stateful Ad Hoc mode. A drag event comprises a user's making a pointer device active, as, for example, in holding down a mouse button, and moving the pointer in the active state, as, for example, in holding down the mouse button and dragging the mouse pointer. Holding down the mouse button and dragging the mouse pointer from and to the first affected checkbox (102) typically has the same effect as holding down the mouse button and dragging the mouse pointer from the first checkbox to and over any other checkbox (106).

Figure 8A:
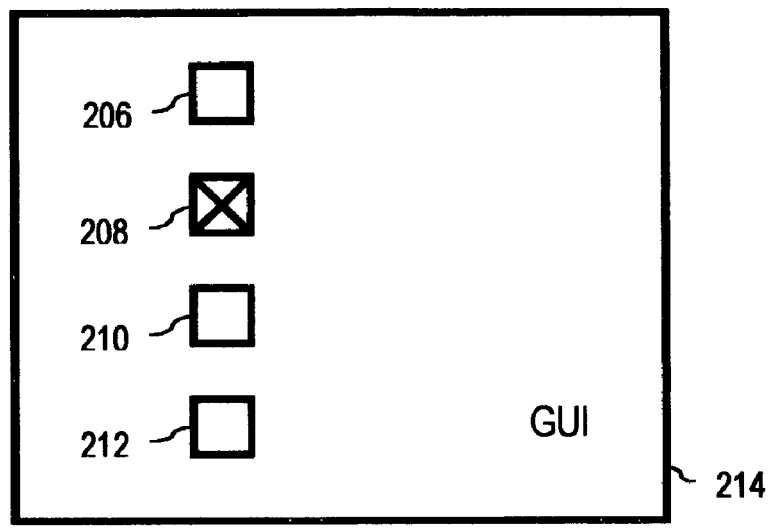
FIG. 8A illustrates initial statuses of checkboxes in a GUI prior to a click and drag event.
Figure 8B:
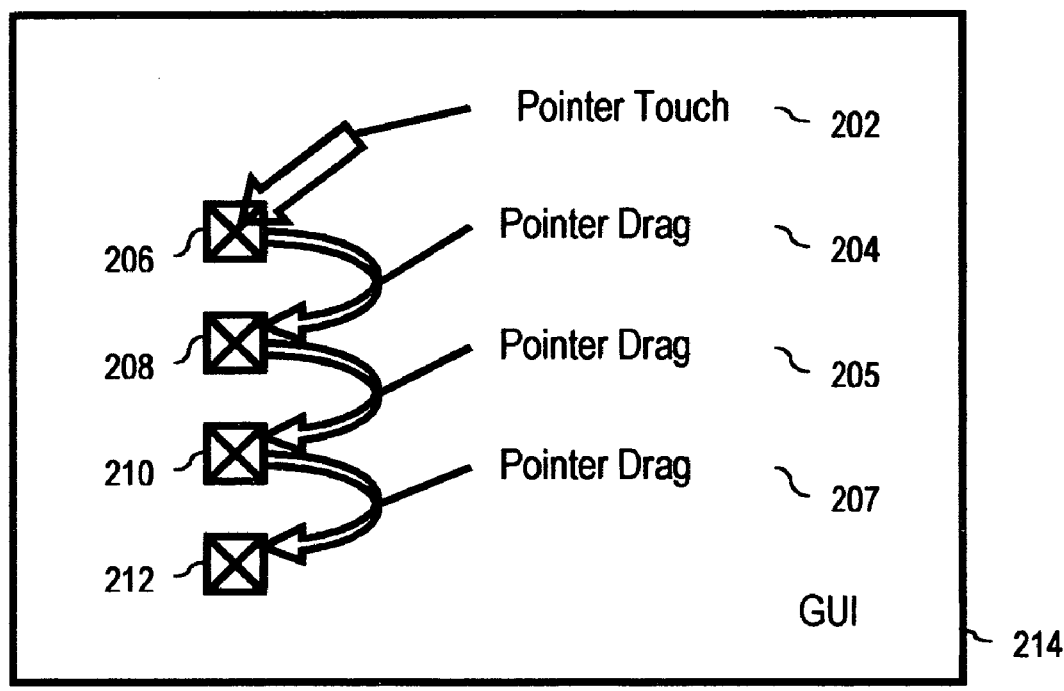
FIG. 8B is a diagram of a click and drag event in a graphical user interface illustrating operation of typical exemplary embodiments of the present invention.
Figure 8C:
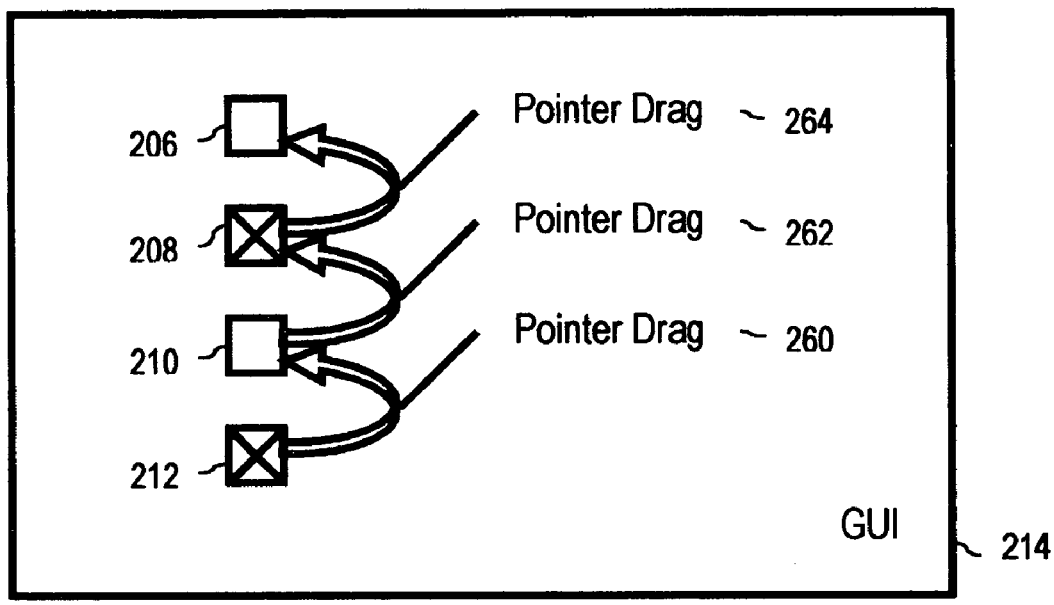
FIG. 8C is a diagram of a continuation from FIG. 8B of the click and drag event in a graphical user interface illustrating operation of typical exemplary embodiments of the present invention.

FIGS. 8A, 8B, and 8C illustrate a further example of the Persistent Stateful Ad Hoc mode of operation. The statuses of the checkboxes in FIGS. 8A, 8B, and 8C are shown with 'Xs.' Selected checkboxes are illustrated with Xs, as those at reference 208 in FIG. 8A. Deselected checkboxes are illustrated without Xs, as the checkbox at references (206), (210), and (212) in FIG. 8A. FIG. 8A illustrates the initial statuses of checkboxes in a GUI prior to a click and drag event. FIGS. 8B and 8C illustrate the results of a touch event followed by a drag on the statuses of the checkboxes whose initial statuses are shown in FIG. 8A.

The checkboxes in FIG. 8B began the illustrative Persistent Stateful Ad Hoc process deselected, as shown in FIG. 8A, except for checkbox (208) whose initial status is 'selected.' In the process illustrated in FIG. 8B, a pointer touch event (202), such as a mouse down event, has been detected on first checkbox (206), the initial statuses of all checkboxes in the set has been detected and stored, and the status of first checkbox (206) has been toggled to a new status, from 'deselected' to 'selected,' as indicated by the 'X' in first checkbox (206). Thus in this example, the new status of the first affected checkbox is 'selected.'

Further in the Persistent Stateful Ad Hoc process illustrated in FIG. 8A, a pointer drag event (204) in the form of a mouse drag from checkbox (206) to checkbox (208) has been detected and the initial status of checkbox (208) has been compared with the new status of the first checkbox, and the status of checkbox (208) has been statefully toggled. Which is to say that the status of checkbox (208) remains unchanged because the comparison showed that the initial status of checkbox (208) is the same as the new status of the first checkbox, 'selected.'

Still further in the Persistent Stateful Ad Hoc process illustrated in FIG. 8A, a further pointer drag event (205) in the exemplary form of a mouse drag from checkbox (208) to checkbox (210) has been detected and the status of checkbox (210) has been statefully toggled from 'deselected' to 'selected,' as indicated by the 'X' in checkbox (210). In this case, the stateful toggle comprised a state change because the initial state of checkbox (210) was 'deselected' and the new state of the first checkbox (206) is 'selected.' Similarly, a further pointer drag event (207), an exemplary mouse drag from checkbox (210) to checkbox (212), toggles the status of checkbox (210) from 'deselected' to 'selected,' as indicated by the 'X' in checkbox (210), because the initial state of checkbox (212) was 'deselected' and the new state of the first checkbox (206) is 'selected.'

The status toggles for checkboxes (208), (210) and (212) are said to be 'stateful toggles' because each status change, or lack of status change, depends on the state of a checkbox, that is, upon the new state of the first checkbox (206). Because checkbox (208) had the initial status 'selected,' upon detecting the drag event for that checkbox and comparing its initial state with the new state of the first checkbox, then the stateful toggle has no effect on the status of that checkbox (208). In Persistent Stateful Ad Hoc mode, utilizing a mouse as a pointer device, the stateful toggle only changes checkbox statuses for dragged upon checkboxes (210, 212) whose initial statuses are different from the new status of the first affected checkbox (206).

FIG. 8C illustrates a continuation of the same touch and drag begun in FIG. 8B and shows even further the sense in which toggles are stateful toggles in embodiments of the present invention. In FIG. 8C, a further pointer drag event (260) in the exemplary form of a mouse drag from checkbox (212) to checkbox (210) has been detected and the status of checkbox (210) has been statefully toggled from 'selected' to 'deselected,' as indicated by the 'X' in checkbox (210). In this case, the stateful toggle comprises a state change because the initial state of checkbox (210) was 'deselected' and the new state of the first checkbox (206) is 'selected.' A further pointer drag event (262), an exemplary mouse drag from checkbox (212) to checkbox (208) statefully toggles the status of checkbox (208), once again with no effect because a comparison shows that the initial status of checkbox (208) is the same as the new status of the first checkbox (206), 'selected.'

FIG. 8C also illustrates the similar nature of the first checkbox with respect to other checkboxes for drag events. A further pointer drag event (264) is detected from checkbox (208) to checkbox (206), resulting in a comparison of the initial state of checkbox (206) with the new state of the first checkbox, which also happens to be checkbox (206). The new state of the first checkbox (206), as described above, is 'selected.' The initial state of checkbox (206) was 'deselected.' Because these two statuses are different, the drag event on checkbox (206) in Persistent Stateful Ad Hoc mode results in a stateful toggle that implements a status change from 'selected' to 'deselected.' This toggle in the status of checkbox (206) has no effect on the new status of the first checkbox. The new status of the first checkbox is set at the time of the initiating touch event and in Persistent Stateful Ad Hoc mode remains the same throughout the entire touch and drag sequence, until the pointer goes inactive as, for example, when a mouse button is released, regardless how many times the first checkbox, or any other checkbox, is toggled by repeated drag events.

Figure 9A:
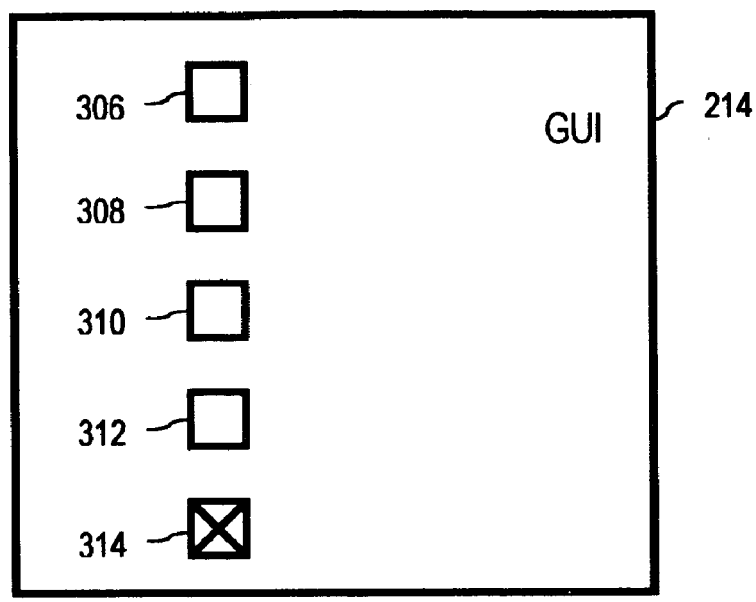
FIG. 9A illustrates initial statuses of checkboxes in a GUI prior to a click and drag event.
Figure 9B:
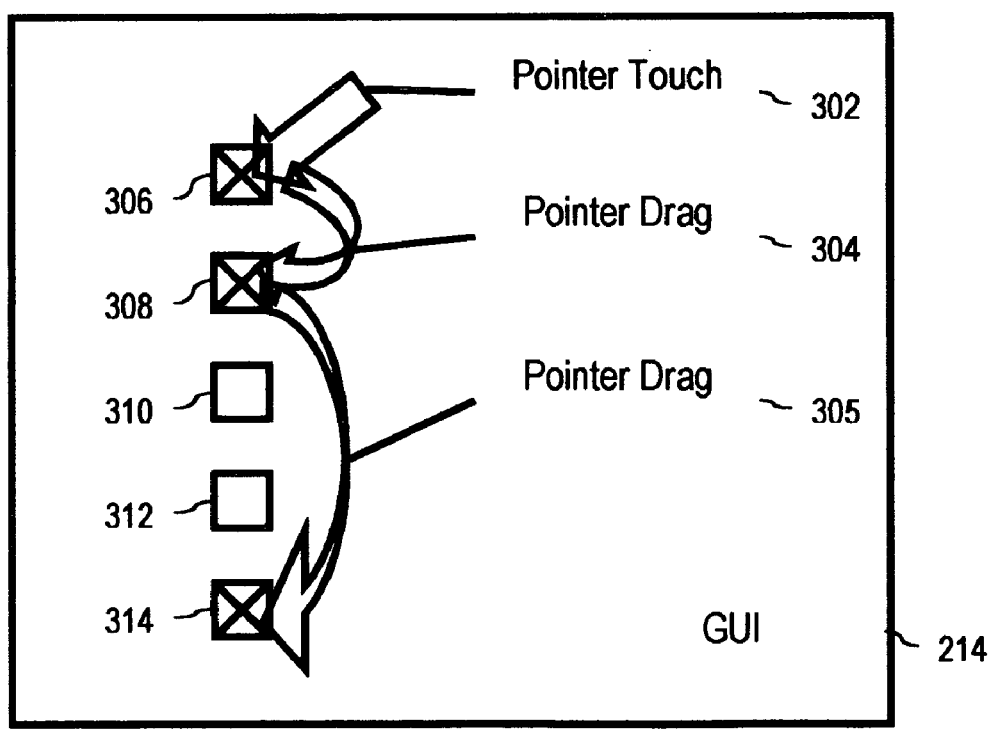
FIG. 9B is a further diagram of a click and drag event in a graphical user interface illustrating operation of typical exemplary embodiments of the present invention.

A still further example of Persistent Stateful Ad Hoc mode is illustrated in FIGS. 9A and 9B. Like the process illustrated in FIGS. 8B and 8C, the example Persistent Stateful Ad Hoc process illustrated in FIG. 9B includes repeated drag events (304, 305). Like the initial statuses illustrated in FIG. 8A, the initial statuses illustrated in FIG. 9A show the initial statuses of checkboxes (306-314) prior to the execution of the click and drag process illustrated by FIG. 9B. In the example of FIG. 9A, however, for at least a portion of the repetitions, one or more further checkboxes (310, 312) are positioned upon the display screen in the GUI (214) between two of the additional checkboxes (308, 312), wherein a path (304) along which the pointer drags between the two additional checkboxes lies outside the further checkboxes, whereby the statuses of the further checkboxes remain unaffected.

More specifically, the checkboxes in the example embodiment of FIG. 9A began the illustrative Persistent Stateful Ad Hoc process deselected, except for the checkbox (314), which, as shown in FIG. 9A, began the illustrative process selected. In the process illustrated in FIG. 9B, a pointer touch event (302) in the exemplary form of a mouse down event has been detected on first checkbox (306), the statuses of all checkboxes in the set has been recorded, and the status of first checkbox (306) has been toggled to a new status, from 'deselected' to 'selected,' as indicated by the 'X' in first checkbox (306).

Further in the exemplary Persistent Stateful Ad Hoc process illustrated in FIG. 9B, a pointer drag event (304) in the exemplary form of a mouse drag from first checkbox (306) to checkbox (308), has been detected and, because its initial status was different from the new status of the first checkbox, the status of checkbox (308) has been statefully toggled from 'deselected' to 'selected,' as indicated by the 'X' in checkbox (308). Still further in the process illustrated in FIG. 9B, a further pointer drag event (305), such as, for example, a mouse drag from checkbox (308) to checkbox (314), has been detected, and, the status of checkbox (314) has been statefully toggled to 'selected,' as indicated by the 'X' in checkbox (314). Because the toggle of checkbox (314) is a stateful toggle, the new status of the first checkbox (306) is 'selected,' and the initial status of checkbox (314) is 'selected,' the stateful toggle therefore has no effect on the status of checkbox (314), leaving the status of checkbox (314) 'selected.'

The examples of FIGS. 8A, 8B, 8C, 6A, and 9B also illustrate the repetitive quality of the Persistent Stateful Ad Hoc mode in that additional checkbox statuses are statefully toggled as a pointer is dragged repeatedly from checkbox to checkbox. FIG. 9B also illustrates that statuses of checkboxes (310, 312) are unaffected if no pointer event is detected for them. That is, neither a touch event nor a drag event is detected for checkboxes (310) and (312) in the example embodiment of FIG. 9B, and the status of checkboxes (310) and (312) therefore remains as it was at the beginning of the illustrative process, 'deselected.'

In the example of FIG. 9B, no drag event was detected for checkboxes (310) and (312) because in dragging the pointer from checkbox (308) to checkbox (314), the pointer was dragged around checkboxes (310) and (312) without touching them or passing over them. FIG. 9B illustrates an important advantage of the Persistent Stateful Ad Hoc mode in that checkbox statuses are toggled in a persistent, stateful, ad hoc fashion just as fast as a user can think and move a pointer across a GUI display, statefully toggling some checkboxes by passing a pointer over them, leaving others unaffected by moving the pointer around them without passing over them.

The pseudocode listing in the Appendix illustrates one exemplary method of implementing the Persistent Stateful Ad Hoc mode of operation for selecting and deselecting GUI components, in this example, checkboxes. Remember that when a click-and-drag sequence begins operation on checkboxes of the exemplary pseudocode, the MousePressed( ) method records the new state of the first affected checkbox (Line 134). MousePressed( ) also set into each checkbox the checkbox's initial state when the first checkbox experienced the mouse press initiating a click-and-drag sequence (Lines 129-132). In this example, when a checkbox, during a ongoing click-and-drag sequence, experiences a mouse drag event, defined as a mouse entry to a checkbox with the mouse pressed, the MouseEntered( ) method (Lines 140-151), records that the mouse is in a checkbox (Line 142), retrieves a reference to the checkbox that reported the mouse entry (Line 143), and, assuming that the current mode is Persistent Stateful Ad Hoc mode ("PSAH"), calls the member method togglePSAHBox(sourceBox), passing as a parameter the reference to the affected box (Line 147).

TogglePSAHBox( ) operates by retrieving from the checkbox experiencing a drag event the initial state of that checkbox, with Line 193:

boolean initial State=sourceBox.getInitialState( );

TogglePSAHBox( ) then compares the initial state of the current box with the new state of the first affect checkbox in the current click-and-drag sequence (Line 194). If the initial state of the current box is not the same as the new state of the first affected box, the state of the current checkbox is toggled (195). As mentioned earlier, in typical embodiments of the present invention, implemented as illustrated in the pseudocode Appendix, the user controlling the mouse can change modes of operation any time the mouse pointer is over a checkbox. So long as the mouse is pressed and dragged from checkbox to checkbox in Persistent Stateful Ad Hoc mode, however, each checkbox entered will have its state toggled if its original state was not the same as the new state of the first checkbox in the sequence.

More particularly, in Persistent Stateful Ad Hoc operation, on an initial mouse press, the source checkbox for the mouse press is toggled. On a subsequent mouse drag and entry over a checkbox, the checkbox dragged over has its state toggled if the initial status of the dragged-upon checkbox is not the same as the new status of the first clicked checkbox, that is, a stateful toggle. If a checkbox has already been dragged over but the mouse button has not been released, subsequent drag and entry over the same checkbox in a single user motion continues to toggle checkboxes whose initial status was not the same as the new status of the first clicked checkbox. Releasing the mouse button ends the sequence.

Non-Persistent Stateful Ad Hoc Checkbox Selection

For explanation of the Non-Persistent Stateful Ad Hoc mode of operations, consider the example of a user whose interface relies on a primary mouse button setup. When a user clicks on an initial checkbox item in a set of checkboxes, referred to as the "first affected checkbox," the "first clicked checkbox," or simply as the "first checkbox," that checkbox is selected or deselected depending on the previous selection state of the first affected checkbox, resulting in a new selection state of the first affected checkbox. That is, the state of the first affected checkbox is toggled. The new selection state of the first checkbox is recorded and retained.

When the user drags outside of the first affected checkbox, the first affected checkbox retains its new selection state. When the user then drags the mouse pointer over additional checkboxes, checkboxes experiencing a first mouse drag have their selection states toggled to the new selection state of the first checkbox. In addition to setting their selection state to the new selection state of the first checkbox, drag state also is set for checkboxes experiencing a first drag event. Subsequent drag events during the same click-and-drag do not affect drag state. Those items selected by dragging the mouse pointer whose selection states are already the same as the new selection state of the initial checkbox are unaffected upon a first drag event but are toggled by subsequent drag events. On subsequent pointer drags over a checkbox, the checkbox's selection status is toggled regardless of its earlier or current selection state.

The first affected checkbox typically is included in this method, that is, in the Non-Persistent Stateful Ad Hoc mode of operation. That is, the new state of the first affected checkbox is recorded, and on subsequent drag operations in the first affected checkbox, its status is toggled, just as the status of other checkboxes is toggled in subsequent drag operations. In a first drag event in a first checkbox, in typical embodiments, the first checkbox's drag state is set 'true' and selection status is not changed because the selection status of the first checkbox was already set to the new selection of the first checkbox when the first checkbox was clicked at the beginning of the current click-and-drag. In such embodiments, in order to get the first checkbox to toggle in drags, it must be dragged twice, two little motions of the GUI pointer, the first one representing a first drag event and the second one representing a subsequent drag event. This mode of operation has the advantage that it makes all programming and all operation for all checkboxes perfectly consistent. To reduce to zero, however, the tiny inconvenience of no effect on first drag in the first checkbox, some embodiments set the drag status of the first checkbox when it is first clicked, despite the fact that, technically speaking, the first checkbox at this point actually has experienced no first drag event, so that all drag events on the first checkbox toggle its selection status, both a first drag event and all subsequent drag events on the first checkbox.

If the user wished to omit items from selection by dragging of the mouse pointer, in typical operation of most embodiments of the present invention, the user simply drags the mouse past or outside the checkboxes for the items to be omitted from selection by the dragging of the mouse pointer. In a checkbox list arranged vertically, the user would drag the mouse pointer past the items by moving the pointer to the left or right and then up or down, so as to bypass checkboxes not to be selected. Of course the reader realizes by now that checkboxes whose initial selection statuses are the same as the new state of the first affected checkbox are unaffected in selection status on first drag events (although their drag states are set on first drags) regardless whether the mouse pointer drags over them or not, so this purpose of not selecting checkboxes with first drag events by missing them with the dragged mouse pointer is in substance directed to checkboxes having initial statuses that are different from the new status of the first affected checkbox.

Figure 10:
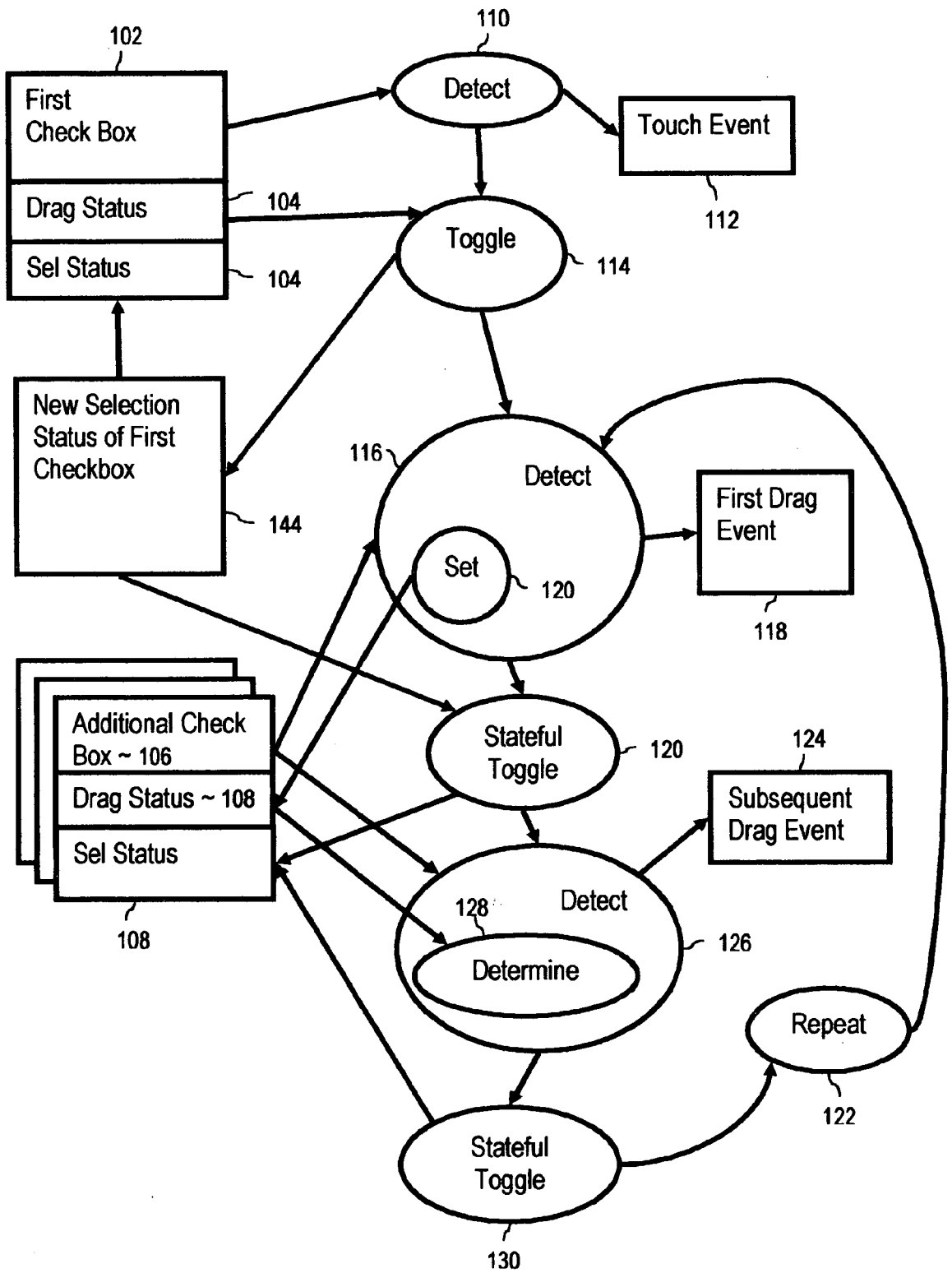
FIG. 10 is a control flow diagram illustrating typical exemplary embodiments of the present invention.

Turning now to FIG. 10, an example of the Non-Persistent Stateful Ad Hoc mode of operations is seen illustrated as a method for non-persistent, stateful, ad hoc toggling of checkbox status. The method of FIG. 10 includes detecting (110) a touch event on a first checkbox (102) and toggling (114) the selection status (104) of the checkbox from its previous selection status to a new selection status of the first checkbox (144). The exemplary method of FIG. 10 includes detecting (116) a first drag event (118) for at least one additional checkbox (106) onto which a user drags a pointer and statefully toggling (120), to the new selection status of the first checkbox, the selection status (108) of the additional touch box for which a drag event is detected. In this exemplary method, detecting (116) a first drag event (118) includes setting the drag status (108) of the additional checkbox (106) to indicate that the checkbox has experienced at least one drag event during a current click-and-drag.

Embodiments of the kind illustrated in FIG. 10 typically include detecting (116) a subsequent drag event (124) for the at least one additional checkbox (106) onto which a user drags the pointer more than once during a click-and-drag operation, including determining (128) in dependence upon the drag status (108) of the additional checkbox whether the additional checkbox has experienced a drag event. This kind of embodiment includes statefully toggling (130) the selection status (108) of the additional checkbox for which a subsequent drag event is detected to the opposite of the selection status of the additional checkbox when the additional drag event is detected. In addition, embodiments of the kind shown in FIG. 10 typically include repeating (122), for a multiplicity of repetitions, the steps of detecting (116) a first drag event for at least one additional checkbox, statefully toggling (120) the selection status of the additional touch box to the new selection status of the first checkbox; detecting (126) a subsequent drag event for the additional checkbox, and statefully toggling (130) the selection status of the additional checkbox to the opposite of the selection status of the additional checkbox when the additional drag event is detected.

Figure 11A:
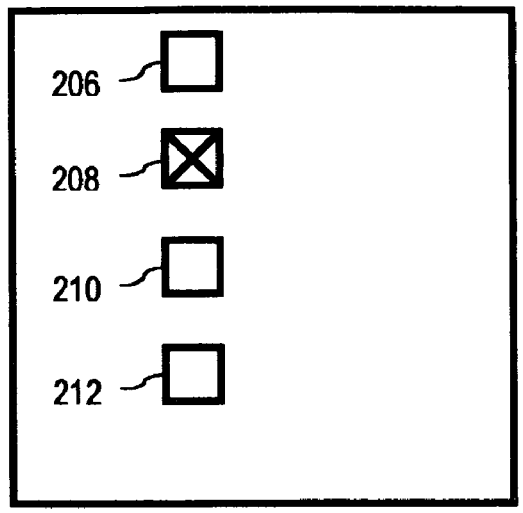
FIG. 11A illustrates initial statuses of checkboxes in a GUI prior to a click-and-drag event.
Figure 11B:
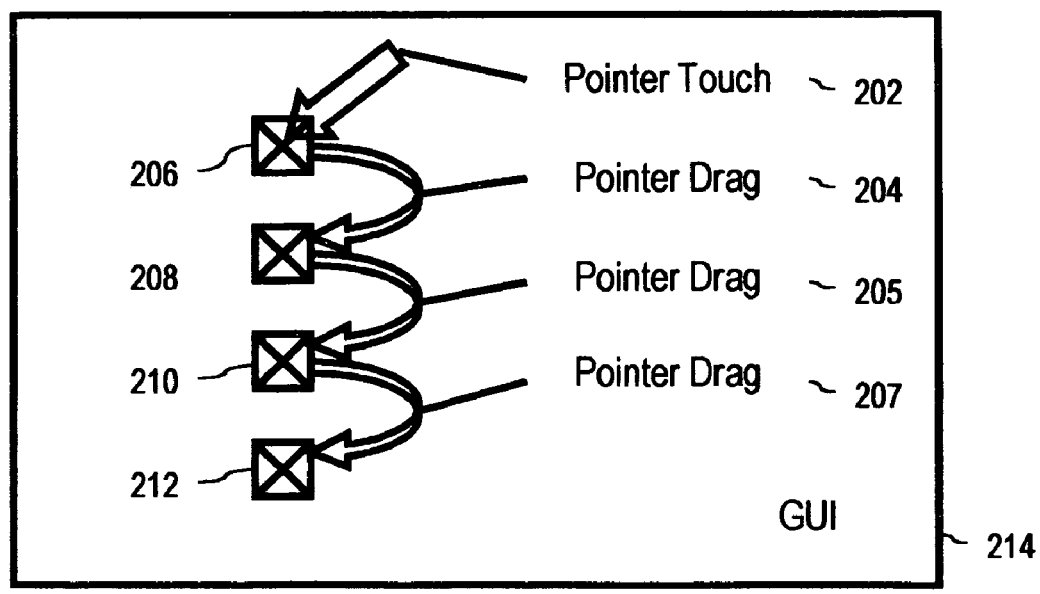
FIG. 11B is a diagram of an example click-and-drag in a GUI illustrating operation of typical exemplary embodiments of the present invention.
Figure 11C:
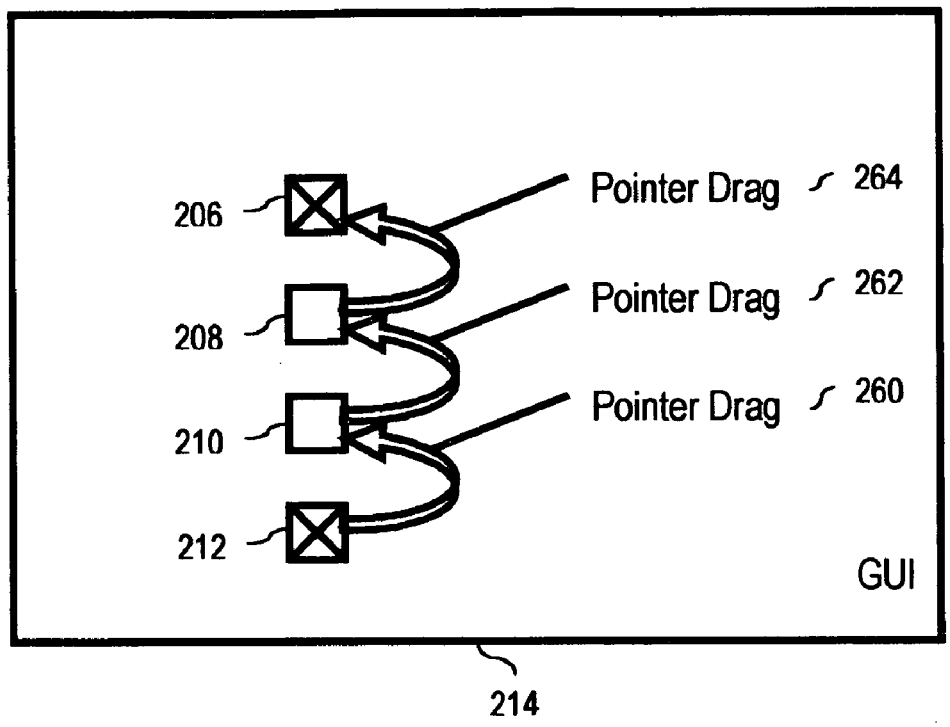
FIG. 11C is a further diagram of an example click-and-drag in a GUI illustrating operation of typical exemplary embodiments of the present invention.

FIGS. 11A, 11B, and 11C illustrate a further example of the Non-Persistent Stateful Ad Hoc mode of operation of a further exemplary embodiment. The selection statuses of the checkboxes in the illustrated embodiment are shown with 'Xs.' Selected checkboxes are illustrated with Xs, as those at reference 208 in FIG. 1A. Deselected checkboxes are illustrated without Xs, as the checkbox at references (206), (210), and (212) in FIG. 11A. FIG. 11A illustrates the initial selection statuses of checkboxes in a GUI prior to a click-and-drag event. FIGS. 11B and 11C illustrate the results of a touch event followed by a drag on the statuses of the checkboxes whose initial statuses are shown in FIG. 11A.

The checkboxes in the example embodiment of FIG. 11B began the illustrative process deselected, as shown in FIG. 11A, except for checkbox (208) whose initial selection status is 'selected.' In the Non-Persistent Stateful Ad Hoc mode of operation as illustrated in FIG. 11B, a pointer touch event (202), such as a mouse down event or 'mouse press,' has been detected on first checkbox (206), and the status of first checkbox (206) has been toggled to a new status, from 'deselected' to 'selected,' as indicated by the 'X' in first checkbox (206). Thus in this example, the new status of the first affected checkbox is 'selected.' The new status of the first checkbox has been retained in computer memory.

Further in the process of Non-Persistent Stateful Ad Hoc operations as illustrated in FIG. 11A, a pointer drag event (204) in the form of a mouse drag from checkbox (206) to checkbox (208) has been detected, and the selection status of checkbox (208) has been statefully toggled to 'selected,' the new selection status of the first checkbox (206). That is, the selection status of checkbox (208) remains unchanged because the selection status of checkbox (208) was already the same as the new status of the first checkbox, 'selected.' The drag state of checkbox (208) is set 'true' (not shown), indicating that checkbox (208) now has experienced a first drag event.

Still further in the process illustrated in FIG. 11A, a further pointer drag event (205) in the exemplary form of a mouse drag from checkbox (208) to checkbox (210) has been detected and the status of checkbox (210) has been statefully toggled from 'deselected' to 'selected,' as indicated by the 'X' in checkbox (210). In this case, the stateful toggle comprised a selection status change because the initial state of checkbox (210) was 'deselected' and the new state of the first checkbox (206) is 'selected.' Similarly, a further pointer drag event (207), an exemplary mouse drag from checkbox (210) to checkbox (212), toggles the status of checkbox (210) from 'deselected' to 'selected,' as indicated by the 'X' in checkbox (210), because the initial state of checkbox (212) was 'deselected' and the new state of the first checkbox (206) is 'selected.' The drag states for both checkboxes (210) and (212) at this point have been set 'true.'

The status toggles for checkboxes (208), (210) and (212) are said to be 'stateful toggles' because change in selection status, or lack of change, depends on the state of a checkbox, that is, upon the new state of the first checkbox (206). Because checkbox (208) had the initial status 'selected,' upon detecting the drag event for that checkbox, the stateful toggle has no effect on the selection status of that checkbox (208). In embodiments of this kind, utilizing a mouse as a pointer device, the stateful toggle on first drag events only changes checkbox statuses for dragged upon checkboxes (210, 212) whose initial statuses are different from the new status of the first affected checkbox (206).

FIG. 11C illustrates a continuation of the same touch and drag begun in FIG. 11B and shows further the sense in which toggles are 'non-persistent' stateful toggles in embodiments of the present invention. In FIG. 11C, a subsequent drag event (260) in the exemplary form of a mouse drag from checkbox (212) to checkbox (210) has been detected and the status of checkbox (210) has been statefully toggled from 'selected' to 'deselected,' indicated by the lack of an 'X' in checkbox (210). In this case, the stateful toggle comprises a state change because the drag state of checkbox (210), which has already experienced a first drag event during the current click-and-drag, is set to to 'true.' Similarly, a subsequent drag event (262), an exemplary mouse drag from checkbox (212) to checkbox (208), toggles the status of checkbox (208) from 'selected' to 'deselected,' again because the drag status of checkbox (208) is 'true.'

FIG. 11C also illustrates the similar nature of the first checkbox with respect to other checkboxes for drag events.

A first drag event (264) is detected from checkbox (208) to checkbox (206). This is a 'first drag event' in the sense that it is a first drag event for the first checkbox (206). Although the first checkbox experienced a mouse press at the beginning of the current click-and-drag, the first checkbox has not yet experienced a drag event as such, so this is its first drag event. Because the first checkbox has not yet experienced its first drag event, its drag state is still reset to 'false.' In response to this first drag event, the drag state of the first checkbox (206) is set 'true,' but the selection status of the first checkbox is unaffected because the selection status of the first checkbox is already set to the new selection state of the first checkbox, 'selected.' For a user to toggle the current selection state of the first checkbox, the user simply drags the pointer out of the first checkbox after its first drag event and then drags the pointer right back in, creating a subsequent drag event which then, upon determining that the drag status of the first checkbox is 'true' (because the drag state was just set by the first drag event) toggles the selection state of the first checkbox.

Figure 12A:
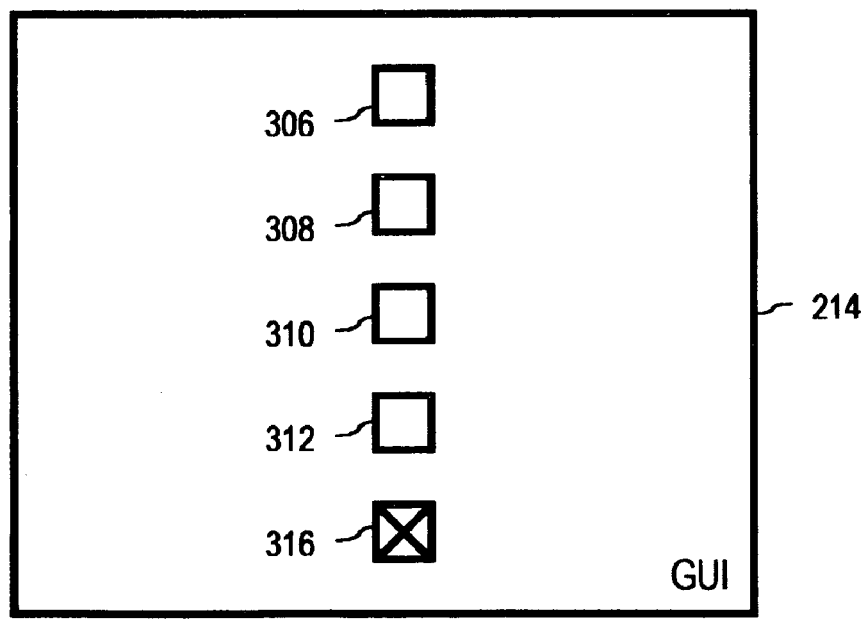
FIG. 12A illustrates initial statuses of checkboxes in a GUI prior to a click-and-drag event.
Figure 12B:
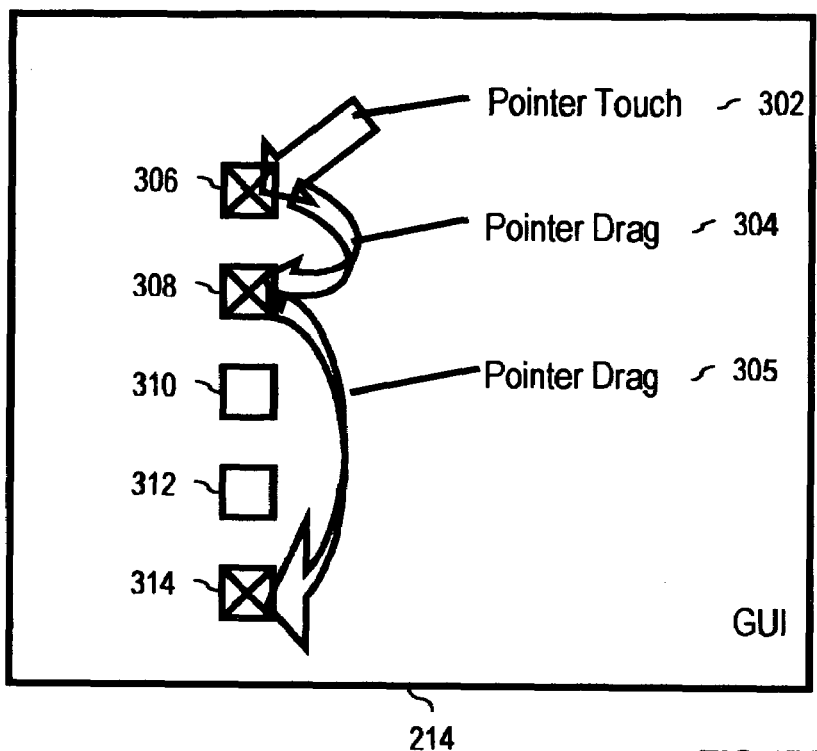
FIG. 12B is a diagram of an example click-and-drag event in a GUI illustrating operation of typical exemplary embodiments of the present invention.
Figure 12C:
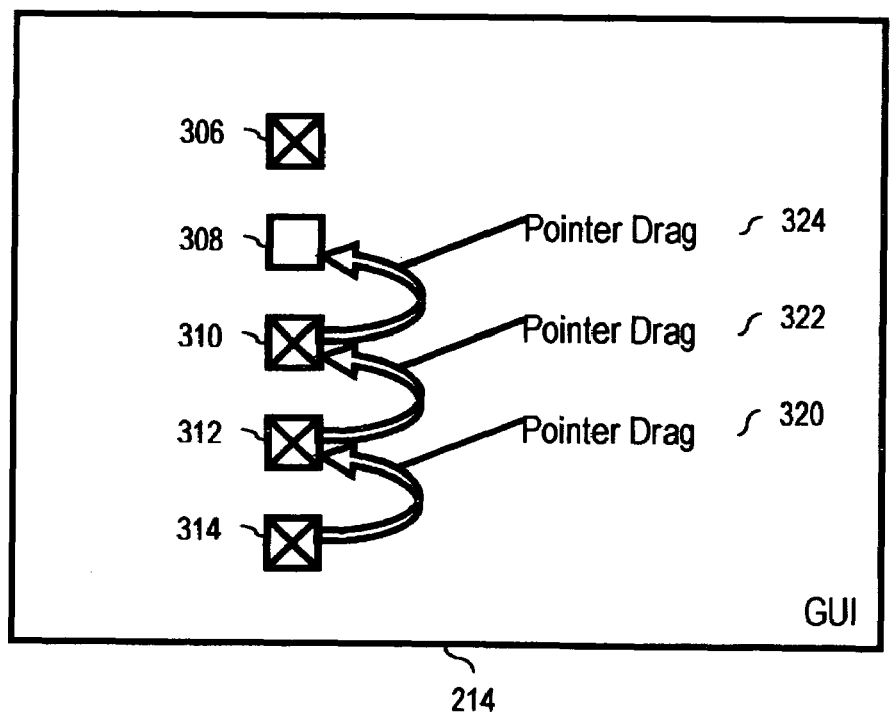
FIG. 12C is a further diagram of an example click-and-drag event in a GUI illustrating operation of typical exemplary embodiments of the present invention.

A still further example the Non-Persistent Stateful Ad Hoc mode of operation is illustrated in FIGS. 12A, 12B, and 12C. Like the process illustrated in FIGS. 11B and 11C, the example process illustrated in FIG. 12B includes repeated drag events (304, 305) during a click-and-drag. Like the initial statuses illustrated in FIG. 11A, the initial statuses illustrated in FIG. 12A show the initial statuses of checkboxes (306-314) prior to the execution of the click-and-drag process illustrated by FIG. 12B. In the example of FIG. 12A, however, for at least a portion of the repetitions, one or more further checkboxes (310, 312) are positioned upon the display screen in the GUI (214) between two of the additional checkboxes (308, 312), wherein a path (304) along which the pointer drags between the two additional checkboxes lies outside the further checkboxes, whereby the statuses of the further checkboxes remain unaffected.

More specifically, the checkboxes in the example embodiment of FIG. 12A began the illustrative process deselected, except for the checkbox (314), which, as shown in FIG. 12A, began the illustrative process selected. In the process illustrated in FIG. 12B, a pointer touch event (302) in the exemplary form of a mouse down event or moue press has been detected on first checkbox (306), the selection status of first checkbox (306) has been toggled to a new status, from 'deselected' to 'selected,' as indicated by the 'X' in first checkbox (306), and the new selection status of checkbox (306) has been retained in computer memory.

Further in the exemplary process illustrated in FIG. 12B, a pointer drag event (304) in the exemplary form of a mouse drag from first checkbox (306) to checkbox (308), has been detected and, because its drag state is reset or 'false,' indicating this is a first drag event, the status of checkbox (308) has been statefully toggled from 'deselected' to 'selected,' the new selection status of the first checkbox. The drag state of checkbox (308) is set to 'true.' Still further in the process illustrated in FIG. 12B, a further pointer drag event (305), such as, for example, a mouse drag from checkbox (308) to checkbox (314), has been detected, and, the selection status of checkbox (314) has been statefully toggled to 'selected,' and its drag state has been set 'true.'

Because the toggle of checkbox (314) is a stateful toggle, the new status of the first checkbox (306) is 'selected,' and the initial status of checkbox (314) is 'selected,' the stateful toggle therefore has no effect on the status of checkbox (314), leaving the status of checkbox (314) 'selected.'

FIG. 12C continues the example of the same click-and-drag begun in FIG. 12B. Without lifting the mouse button, the user continues to drag the pointer back up the GUI screen, this time dragging on checkboxes (312) and (310). That is, checkbox (312) now experiences a first pointer drag event (320), determined in fact to be a first drag event because upon detecting this drag event (320), the drag state for checkbox (312), which has not been dragged before during the current click-and-drag, is still 'false.' This first drag event (320) for checkbox (312) sets the drag state to 'true' for checkbox (312) and statefully toggles the selection state for checkbox (312) to 'true,' as shown now by the 'X' in checkbox (312). Similarly, drag event (322) is a first drag event for checkbox (310), which sets to 'true' the drag state for checkbox (310) and sets to 'selected' the selection status for checkbox (310). Pointer drag event (324), however, is a subsequent drag event for checkbox (308), identified as such by the fact that the drag status for checkbox (308) was already set 'true' during its first drag event described above. Subsequent drag event (324) therefore statefully toggles the selection state of checkbox (308) from 'selected' to 'deselected,' as shown by the lack of an 'X' in checkbox (308) on FIG. 12C.

The examples of FIGS. 11A, 11B, 11C, 12A, 12B, and 12C also illustrate the repetitive quality of operations in Non-Persistent Stateful Ad Hoc mode in that additional checkbox statuses are statefully toggled as a pointer is dragged repeatedly from checkbox to checkbox. FIG. 12B also illustrates that statuses of checkboxes (310, 312) are unaffected if no pointer drag event is detected for them. That is, neither a touch event nor a drag event is detected for checkboxes (310) and (312) in the example embodiment of FIG. 12B, and the status of checkboxes (310) and (312) therefore remains as it was at the beginning of the illustrative process, 'deselected.'

In the example of FIG. 12B, no drag event was detected for checkboxes (310) and (312) because in dragging the pointer from checkbox (308) to checkbox (314), the pointer was dragged around checkboxes (310) and (312) without touching them or passing over them. FIG. 12B illustrates an important advantage of the present invention in that checkbox statuses are toggled in a completely ad hoc fashion just as fast as a user can think and move a pointer across a GUI display, statefully toggling some checkboxes by passing a pointer over them, leaving others unaffected by moving the pointer around them without passing over them.

The pseudocode listing in the Appendix illustrates an exemplary method of implementing the Non-Persistent Stateful Ad Hoc mode of operation for selecting and deselecting GUI components, in this example, checkboxes. As described above, when a click-and-drag sequence begins operation on checkboxes of the exemplary pseudocode, the MousePressedo method records the new state of the first affected checkbox (Line 134). MousePressedo also sets into each checkbox the checkbox's initial state when the first checkbox experienced the mouse press initiating a clickand-drag sequence (Lines 129-132). In this example, when a checkbox, during a ongoing click-and-drag sequence, experiences a mouse drag event, defined as a mouse entry to a checkbox with the mouse pressed, the MouseEnteredo method (Lines 140-151), records that the mouse is in a checkbox (Line 142), retrieves a reference to the checkbox that reported the mouse entry (Line 143), and, assuming that the current mode is Non-Persistent Stateful Ad Hoc mode ("PSAH"), calls the member method toggleNPSAHBox (sourceBox), passing as a parameter the reference to the affected box (Line 148).

ToggleNPSAHBox( ) operates by retrieving from the current checkbox its drag status and its initial state. The operation of the Non-Persistent Stateful Ad Hoc mode differs according to whether a current drag event is the first drag event that a checkbox has experienced during a particular click-and-drag sequence or a subsequent drag event. It is useful therefore to record drag status, and the aCheckBox class (Lines 14-20) in this example inventively extends the standard Java JCheckBox class with a member data element dragstatus for storing drag status and with accessor methods for storing and retrieving drag status. If the current checkbox has not previously been dragged over, toggleNPSAHBox( ) sets its drag status (Lines 209-210); then if the initial state of the current box is different from the new state of the first checkbox in the present click-and-drag sequence, toggleNPSAHBox( ) sets the current checkbox to the new state of the first affected checkbox in the current sequence (Lines 211-212). If the current checkbox has previously been dragged over during the present click-and-drag sequence, toggleNPSAHBox( ) toggles the state of the current checkbox (Lines 214-215).

Just as is true for the other modes described above, checkboxes subject to drag events within a click-and-drag according to the Non-Persistent Stateful Ad Hoc mode of operation include the first checkbox, that is, the checkbox in which a mouse press initiated a particular click-and-drag. This is true because users are empowered in typical embodiments of the the Non-Persistent Stateful Ad Hoc mode to effect a mouse press in a first checkbox, thereby initiating a click-and-drag, and drag the pointer out of the first checkbox, and then later, during the same click-and-drag, drag the pointer back over the first checkbox. Here again is illustrated a reason why embodiments of this mode of operation are referred to as implementing non-persistent stateful toggles. That is, the toggles are 'stateful' in that their status changes depend on the status of the first checkbox and upon the current state of a dragged checkbox. And the toggles typically are 'non-persistent' in the sense that states resulting from stateful toggles nevertheless are altered by subsequent drag effects during a single click-and-drag.

As mentioned earlier, in typical embodiments of the present invention, implemented as illustrated in the pseudocode Appendix, the user controlling the mouse can change modes of operation any time the mouse pointer is over a checkbox. So long as the mouse is pressed and dragged from checkbox to checkbox in Non-Persistent Stateful Ad Hoc mode, however, each checkbox entered on a first drag has its state set to the new state of the first box, and, on subsequent drags, its state is toggled.

In summary, then, for the Non-Persistent Stateful Ad Hoc mode of operation, on an initial mouse press of a click-and-drag event, the source checkbox for the mouse press is toggled to a new selection state of the first checkbox affected by the click-and-drag. As the click-and-drag continues, on a first drag event over a checkbox, the checkbox dragged over has its selection state changed to the new state of the first checkbox. If a checkbox has already been dragged over but the mouse button has not been released, subsequent drag and entry over the same checkbox in a single click-and-drag motion has the effect of toggling the selection state of the checkbox. Releasing the mouse button ends a click-and-drag operation.

Mode Switching

Figure 13:
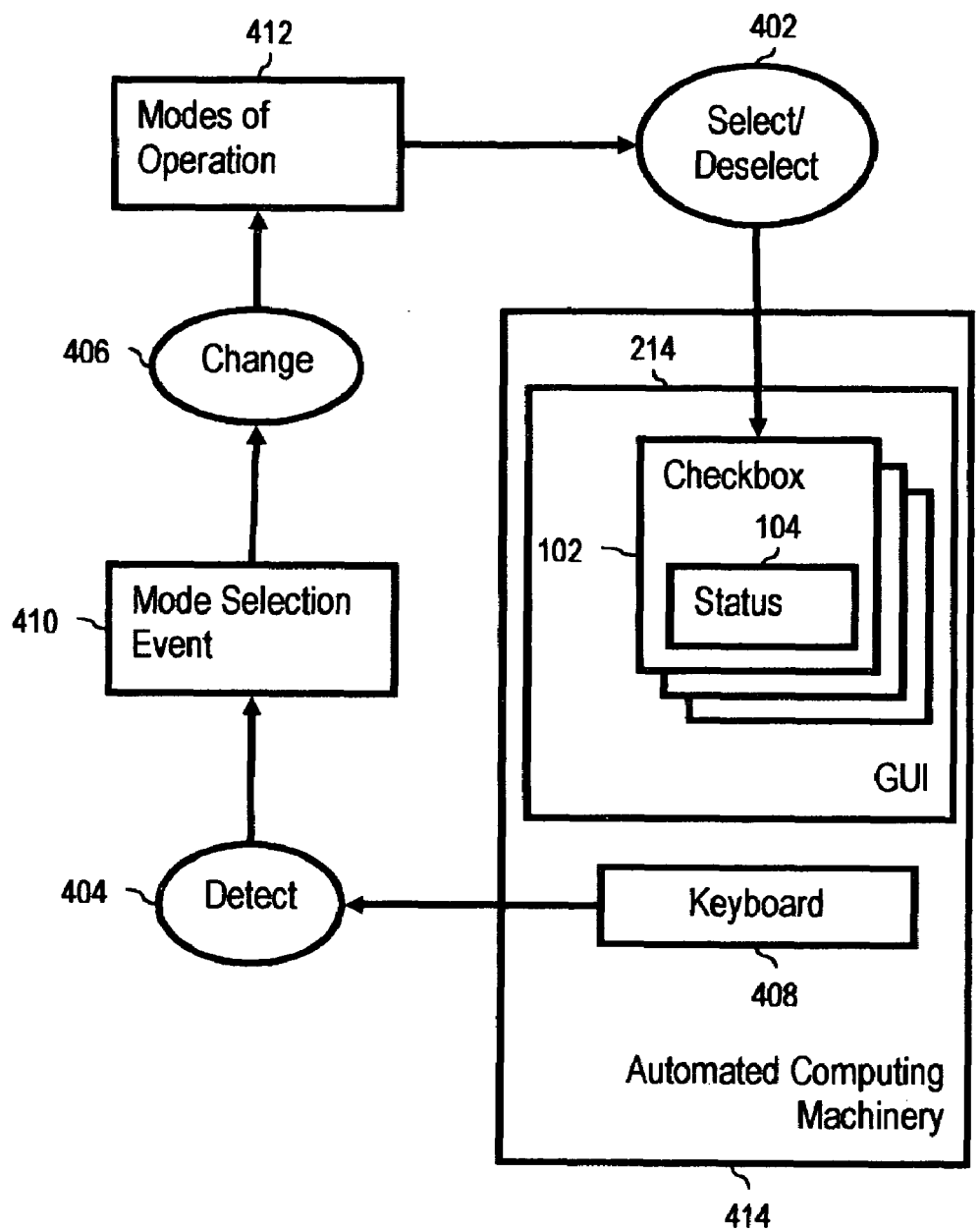
FIG. 13 sets forth a data flow diagram illustrating a method for control of checkbox status.

Typical embodiments of the present invention support multiple modes of operation, that is, multiple modes of selection and deselection of data elements. In typical embodiments of the present invention, a user controlling a mouse can change modes of operation any time the mouse pointer is over a checkbox. An exemplary method of changing modes is explained by reference to FIG. 13 and to the pseudocode Appendix. FIG. 13 sets forth a data flow diagram illustrating a method for control of checkbox status where the method includes selecting and deselecting (402) checkboxes (102) in a GUI (214) according to a mode of operation (412), the GUI having displayed upon it a set of checkboxes comprising a multiplicity of checkboxes, wherein each checkbox comprises a selection status (104) indicating whether each checkbox is selected.

In FIG. 13, the checkboxes (102) are shown for explanation in a GUI (214) installed and operating on automated computing machinery (414). The term 'automated computing machinery' is chosen to point out that the use of any kind of computer capable of supporting a GUI is well within the scope of the present invention, including portable telephones, personal digital assistants, laptop computer, wireless handheld devices, and so on, as will occur to those of skill in the art.

Four modes of operation are described in detail above in this specification. The number four is a convenient number for explanation, not a limitation of the present invention. In fact, methods and systems for selecting and deselecting checkboxes according to embodiments of the present invention can support any number of modes of operation as will occur to those of skill in the art. Moreover, the data structures of checkboxes are not limited to indications of selection status (104). Depending upon the modes of operations to be supported in any particular embodiment of the present invention, data elements in checkboxes can include, for example, drag status, initial state of the checkbox upon beginning a click-and-drag, and so on, as will occur to those of skill in the art.

The method of FIG. 13 includes detecting (404) a mode selection event (410). In many embodiments of the present invention, including the exemplary embodiment of the pseudocode Appendix, a mode selection event (410) is a keypress on a keyboard (408). A keypress is used here for explanation, however, not for limitation. In fact, any event cognizable in a user interface, can be implemented as a mode selection event within the scope of the present invention including, for example, a mousepress on a radio button, a selection from a pull-down menu, a mousepress on a component in a dialogue box, and so on, as will occur to those of skill in the art.

The method of FIG. 13 includes changing (406) the mode of operation (412) in dependence upon a detected mode selection event (410). An exemplary implementation of changing (406) the mode of operation (412) in dependence upon a detected mode selection event (410) is provided in the pseudocode Appendix. At Lines 52-57, the constructor for CheckBoxDemo instantiates the key listener aKeyChoiceListener and registers the key listener with all supported checkboxes.

At the beginning of a click-and-drag, CheckBoxListener.MousePressed( ) sets the default mode and mousePressed=true (Lines 23-24). When a pointer is dragged onto a box, CheckBoxListener.MouseEntered( ) sets mouseInBox=true (Line 142). When a pointer is dragged out of a box, CheckBoxListener.MouseExited( ) resets mouseInBox (Line 154). When a mouse press is release, CheckBoxListener.MouseReleased( ) resets mousePressed (Line 157). While a mouse is pressed and in a box, therefore, mousePressed and mouseInBox record that fact.

When a keypress is detected in a checkbox, the checkbox creates a key event and calls an appropriate member method its registered key listener, passing the key event as a call parameter. In this example, the registered key listener is an object of class KeyChoiceListener (Lines 227-248), and the appropriate member method is keyTypedo. In this example, keyTypedo is overridden so that it processes keystrokes only when a mouse is pressed and in a box (Line 229). KeyTyped here also is overridden to respond only to keys pertinent to mode changes, in this examples, the '1,' '2,' '3,' and '4' keys corresponding to the modes AH, SAH, PSAH, and NPSAH for Ad Hoc, Stateful Ad Hoc, Persistent Stateful Ad Hoc, and Non-Persistent Stateful Ad Hoc respectively. That is, when a key is pressed when a mouse is pressed and in a box, keyType( ) retrieves a keycode identifying the key (Line 230) and, through a switch( ) statement (Lines 231-245) sets a new mode of operation according to the value of the keycode. This then is an example of changing (406) the mode of operation (412) in dependence upon a detected mode selection event (410) where the detected mode selection event is a keypress on a key identified by a keycode.

In typical operation according to embodiments of the present invention, a checkbox is toggled when dragged upon as soon as a mouse entry into the box is detected, resulting in an immediate selection or deselection of the box according to the current mode of operation. If a user then types a key to change modes, the keypress is detected and the mode is changed after the box has already been selected or deselected according to the old mode, the then-current mode when the mouse entered the box. If, for example, the user wished the current box toggled according to the new mode, the user would drag the mouse pointer out of the current box and then back into the current box, all the while holding the mouse pressed so as to continue the same overall click-and-drag sequence. After the mode is changed, so long as the user holds the mouse pressed, thereby continuing the same overall click-and-drag sequence, each checkbox entered by the mouse pointer is toggled according to the new mode of operation. The use can change modes as often as desired during the same overall click-and-drag.

Embodiments of this invention have wide practical applications, including the following additional examples:

Additional alternative example embodiment: An e-commerce application in which a user selects multiple items for an online shopping cart. Prior to this invention, a user would need to provide a single click for each item in a shopping cart list, or select all items in a list. If the user desires to make ad hoc selections, which is likely in an online purchasing context, the user would need to make single clicks for each selection. Use of embodiments of this invention greatly simplifies the process, thus allowing a single click-and-drag operation to make multiple purchases.

Additional alternative example embodiment: An online search engine in which user selects returned search items by choosing those answers best meeting the original query. Embodiments of this invention facilitate quick selection of those items, allowing the search engine to narrow the search criteria by profiling the selected documents.

Additional alternative example embodiment: A database application that allows ad hoc selection of multiple items, and subsequent search on the subset of selected items. Embodiments of this invention facilitate quick narrowing from a set of items returned from a database to a smaller subset. Such would be especially useful when selected items are linked in a sequence to a set of related data. For example, a real estate database may return a set of initial addresses. Users select items on an ad hoc basic and are then taken to data that characterizes those addresses.

Methods that facilitate ad hoc selection of checkbox items using a single click-and-drag operation achieve many goals of contemporary computing. Such methods are consistent with user interface design principles that encourage the minimum number of operations necessary to complete a task. From an ease-of-use perspective, a single click-and-drag approach to checkbox lists has several advantages. For example, it is vastly preferable for users with physical impairments that may make repeated selection of items difficult. These include users who have suffered repetitive motion injuries or whose fine motor skills make clicking on individual checkbox items more difficult. Guidelines from the Human Factors and Ergonomics Society (HFES 200-199X) encourage adoption of interfaces that address keyboard considerations, reduce multiple operations, and identify pointer alternatives, both for users who require assisting devices and those who do not. Even for those users who face no special challenges in pointer operation, this invention greatly reduces the difficulty in selecting multiple items in a checkbox list.

In conclusion, typical embodiments of this invention turn away from the traditional approach toward checkbox lists by providing, among other improvements, an option for users to change checkbox states for multiple checkboxes with a single click-and-drag operation, thus facilitating ad hoc selection of computerized data. Many embodiments of this invention are platform independent and suitable for compiled and web-based applications on any operating system.

It will be understood from the foregoing description that various modifications and changes may be made in the exemplary embodiments of the present invention without departing from its true spirit. The descriptions in this specification are for purposes of illustration only and should not be construed in a limiting sense. The scope of the present invention should be limited only by the language of the following claims.

COMPUTER PROGRAM LISTING APPENDIX

```
/***   CHECKBOXDEMO.JAVA
       Pseudocode for exemplary Java source file CheckBoxDemo.java
***/

// import Java classes useful for implementing an ad hoc checkbox set.
import java.awt.*;              import java.awt.event.*;
import javax.swing.*;           import javax.swing.event.*;

/***   ACHECKBOX CLASS
       extend the Java JCheckBox class with drag status,
       initial state, and accessor methods
***/
class aCheckBox extends JCheckBox {
       private boolean dragStatus = false;
       private boolean initialState;
       public void setDragStatus(boolean ds) {dragStatus = ds;}
       public boolean getDragStatus() {return dragStatus;}
       public void setInitialState(boolean is) {initialState = is;}
       public boolean getInitialState() {return initialState;}
}

/***   CHECKBOXDEMO CLASS
       constructs demonstrative checkboxes, constructs and registers
``` event listeners, creates and makes visible a display window
***/
public class CheckBoxDemo extends JPanel { public CheckBoxDemo() {        // constructor for CheckBoxDemo class

// Create checkboxes
        aCheckBox boxOne = new aCheckBox();
        aCheckBox boxTwo = new aCheckBox();
        aCheckBox boxThree = new aCheckBox();
        aCheckBox boxFour = new aCheckBox();

// Register a checkbox listener with each checkbox.
        // CheckBoxListener extends MouseInputAdapter,
        // an implementation of MouseInputListener which in turn
        // extends MouseListener. So here, a new CheckBoxListener
        // is added to each checkbox through addMouseListener()
        CheckBoxListener aCheckBoxListener = new CheckBoxListener();
        boxOne.addMouseListener (aCheckBoxListener);
        boxTwo.addMouseListener (aCheckBoxListener);
        boxThree.addMouseListener (aCheckBoxListener);
        boxFour.addMouseListener (aCheckBoxListener);

// For detecting mode selection events, create a
        // key listener, register the checkbox listener with
        // the key listener, and register the key listener
        // with each checkbox

```java
KeyChoiceListener aKeyChoiceListener = new KeyChoiceListener();

boxOne.addKeyListener(aKeyChoiceListener);
boxTwo.addKeyListener(aKeyChoiceListener);
boxThree.addKeyListener(aKeyChoiceListener);
boxFour.addKeyListener(aKeyChoiceListener);

// Place the checkboxes in a GUI panel, set layout and borders
JPanel checkPanel = new JPanel();
checkPanel.setLayout(new GridLayout(0, 1));
checkPanel.add(boxOne);    checkPanel.add(boxTwo);
checkPanel.add(boxThree);  checkPanel.add(boxFour);
setLayout(new BorderLayout());
add(checkPanel, BorderLayout.WEST);
setBorder(BorderFactory.createEmptyBorder(20,20,20,20));

}//end constructor CheckBoxDemo()

// The main method for the CheckBoxDemo class.
// Creates a frame and makes its contents visible
public static void main(String s[]) {
    JFrame frame = new JFrame("CheckBoxDemo");
    frame.addWindowListener(new WindowAdapter() {
        public void windowClosing(WindowEvent e) {
            System.exit(0);
        }
    });
```

```
            frame.setContentPane(checkPanel);
            frame.pack();
            frame.setVisible(true);
      }//end public static void main(String s[])

} // end CheckBoxDemo class

/***    CHECKBOXLISTENER CLASS
        Listens for mouse presses and mouse drags on checkboxes,
        selects and deselects checkboxes according to a current mode
        of operation.
***/
class CheckBoxListener extends MouseInputAdapter {

// storage for current mode of operation
      private string currentMode;   public int AH = 1, SAH = 2, PSAN = 3, NPSAH = 4;

// state variable for mouse press
      private boolean mousePressed = false;

// state variable for mouse in a box
      private boolean mouseInBox = false;

// reference storage for checkboxes originating events
      private aCheckBox sourceBox;
```

```
// reference storage for first checkbox
private aCheckbox firstCheckBox;

// storage for original state of first checkbox
private boolean originalStateFirstBox;

// storage for new state of first checkbox
private boolean newStateFirstBox;

// storage for original states of all checkboxes
private boolean originalStateBoxOne;
private boolean originalStateBoxTwo;
private boolean originalStateBoxThree;
private boolean originalStateBoxFour;

// event processing for mouse presses on checkboxes
public void MousePressed(MouseEvent me) {
        currentMode = "AH";  // set default mode of operation
        mousePressed = true;
        firstCheckBox = (aCheckBox) me.getSource();
        originalStateFirstBox = firstCheckBox.isSelected();

// Get and store original values for all checkboxes,
        boxOne.setInitialState(boxOne.isSelected());
        boxTwo.setInitialState(boxTwo.isSelected());
        boxThree.setInitialState(boxThree.isSelected());
        boxFour.setInitialState(boxFour.isSelected());
```

```
            newStateFirstBox = toggleBox(firstCheckBox);

firstBox.setDragStatus(true);

}//end MousePressed()

// event processing for mouse entering a checkbox,
// that is: mouse drag events
public void MouseEntered(MouseEvent me) {
        if(mousePressed) {
                mouseInBox = true;
                sourceBox = (aCheckBox) me.getSource();
                switch (currentMode) {
                    Case AH:   toggleAHBox(sourceBox);  break;
                    Case SAH:  toggleSAHBox (sourceBox); break;
                    Case PSAH: togglePSAHBox(sourceBox); break;
                    Case NPSAH: toggleNPSAHBox(sourceBox); break:
                } // end switch()
        }
}//end MouseEntered()

// event processing for mouse exiting a box, reset mouseInBox
public void MouseExited(MouseEvent e) {mouseInBox = false;}

// event processing for mouse release, reset mousePressed
public void MouseReleased(MouseEvent e) {mousePressed = false;}

// a generic method for toggling the status of a checkbox
```

```
// and returning its new status
private boolean toggleBox(aCheckBox sourceBox) {
    boolean sourceState;
    if((sourceState = sourceBox.isSelected()) == true) {
        sourceBox.setSelected(false);
        return(false);
    }
    else {
        sourceBox.setSelected(true);
        return(true);
    }
}

/***    AD HOC MODE
        Boxes experiencing a mouse drag are toggled
***/
private void toggleAHBox(sourceBox) {
    boolean newBoxState = toggleBox(sourceBox);
}//end toggleAHBox()

/***    STATEFUL AD HOC MODE
        boxes experiencing a mouse drag are toggled to the
        new value of the first checkbox
***/
private void toggleSAHBox(sourceBox) {
    sourceBox.setSelected(newStateFirstBox);
}//end toggleSAHBox()
```

```
/***    PERSISTENT STATEFUL AD HOC

Boxes experiencing mouse drags are toggled if their initial states are different from the new state of the first clicked checkbox.
***/
private void togglePSAHBox(sourceBox) { boolean initialState = sourceBox.getInitialState();

if(initialState != newStateFirstBox)

boolean newBoxState = toggleBox(sourceBox);

} // end togglePSAHBox()

/***    NON-PERSISTENT STATEFUL AD HOC

Boxes experiencing first mouse drags are toggled if their initial states are different from the new state of the first clicked checkbox. Drag status is tracked and checked. On subsequent pointer drags over a checkbox, the checkbox's selection status is toggled regardless of its earlier or current selection state.
***/
private void toggleNPSAHBox(sourceBox) { boolean dragStatus = sourceBox.getDragStatus();

boolean initialState = sourceBox.getInitialState();

if(dragStatus == false) { sourceBox.setDragStatus(true);

if(initialState != newStateFirstBox)

sourceBox.setSelected(newStateFirstBox);

}
```

```
            else if(dragStatus == true) {
                    boolean newBoxState = toggleBox(sourceBox);
            }
    } // end toggleNPSAHBox()

}//end class CheckBoxListener extends MouseInputAdapter

/***    KEYCHOICELISTENER CLASS
    A key listener to receive mode selections --
    Created by extending a Java adapter class, thereby reducing programming
    burden to overriding only the methods of interest. In this example,
    the only overridden method is keyTyped(KeyEvent e)
***/
public class KeyChoiceListener extends KeyAdapter {
    public void keyTyped(KeyEvent e) {
        if(mousePressed && mouseInBox) {
            int keyCode = e.getKeyCode();
            switch (keychoice.getKeyCode) {
                Case keycode == 1:
                        aCheckBoxListener.currentMode = AH; break;
                Case keycode == 2:
                        aCheckBoxListener.currentMode = SAH; break;
                Case keycode == 3:
                        aCheckBoxListener.currentMode = PSAH; break;
                Case keycode == 4:
                        aCheckBoxListener.currentMode = NPSAH; break:
                Default:
```

```
                    // do nothing: occurs when the keycode is
                    // irrelevant. That is, a key was pressed but it
                    // was the '9' key or the 'x' key or some other key
                    // having no effect on mode selection
        } // end switch()
    } if(mousePressed && mouseInBox) {
  } // end keyTyped()
} // end keyChoiceListener class
```

What is claimed is:

1. A method for control of checkbox status, the method comprising:

selecting and deselecting checkboxes in a GUI according to a mode of operation, the GUI having displayed upon it a set of checkboxes comprising a multiplicity of checkboxes, wherein each checkbox comprises a selection status indicating whether each checkbox is selected;

detecting a mode selection event;

changing the mode of operation in dependence upon the detected mode selection event.

2. The method of claim 1 wherein selecting and deselecting checkboxes in a GUI according to a mode of operation comprises:

detecting a touch event on a check box in the GUI;

toggling the status of the check box; and repeatedly, for a multiplicity of repetitions;

detecting a drag event for each additional check box onto which a user drags the pointer, wherein the user drags the pointer onto at least one additional check box; and toggling the status of each additional touch box for which a drag event is detected.

3. The method of claim 1 wherein selecting and deselecting checkboxes in a GUI according to a mode of operation comprises:

detecting a touch event on a first check box in the GUI;

toggling the status of the first check box to a new status;

repeatedly, for a multiplicity of repetitions, carrying out the steps of:

detecting a drag event for each additional check box onto which a user drags the pointer, wherein the user drags the pointer onto at least one additional check box; and statefully toggling the status of each additional touch box for which a drag event is detected to the new status of the first check box.

4. The method of claim 1 wherein selecting and deselecting checkboxes in a GUI according to a mode of operation comprises:

detecting a touch event on a first checkbox in the GUI;

storing the initial status of all checkboxes in the set;

toggling the status of the first checkbox to a new status; and repeatedly, for a multiplicity of repetitions:

detecting a drag event for a checkbox onto which a user drags the pointer;

comparing the initial status of the checkbox onto which a user drags the pointer and the new status of the first checkbox; and if the stored initial status of a checkbox for which a drag event is detected is the same as the new status of the first checkbox, toggling the status of the checkbox for which a drag event is detected.

5. The method of claim 1 wherein each checkbox comprises a drag status indicating whether each checkbox has experienced a drag event and selecting and deselecting checkboxes in a GUI according to a mode of operation comprises:

detecting a touch event on a first checkbox in the GUI;

toggling the status of the first checkbox to a new status;

setting the drag status of the first checkbox;

detecting first drag events on additional checkboxes onto which a user drags the pointer, including setting a drag status of the additional checkboxes indicating that the additional checkboxes have experienced a drag event;

statefully toggling, to the new selection status of the first checkbox, the status of the additional checkboxes;

detecting subsequent drag events for additional checkboxes onto which a user drags the pointer more than once during a click-and-drag operation, including determining in dependence upon the drag statuses of the additional checkboxes whether the additional checkboxes have experienced a drag event; and statefully toggling the selection status for each additional checkbox for which a subsequent drag event is detected to the opposite of the selection status of such additional checkbox when the additional drag event is detected.

6. A system for control of checkbox status, the system comprising:

means for selecting and deselecting checkboxes in a GUI according to a mode of operation, the GUI having displayed upon it a set of checkboxes comprising a multiplicity of checkboxes, wherein each checkbox comprises a selection status indicating whether each checkbox is selected;

means for detecting a mode selection event;

means for changing the mode of operation in dependence upon the detected mode selection event.

7. The system of claim 6 wherein means for selecting and means for deselecting checkboxes in a GUI according to a mode of operation comprises:

means for detecting a touch event on a check box in the GUI;

means for toggling the status of the check box; and repeatedly, for a multiplicity of repetitions:

means for detecting a drag event for each additional check box onto which a user drags the pointer, wherein the user drags the pointer onto at least one additional check box; and means for toggling the status of each additional touch box for which a drag event is detected.

8. The system of claim 6 wherein means for selecting and means for deselecting checkboxes in a GUI according to a mode of operation comprises:

means for detecting a touch event on a first check box in the GUI;

means for toggling the status of the first check box to a new status;

repeatedly, for a multiplicity of repetitions, carrying out:

means for detecting a drag event for each additional check box onto which a user drags the pointer, wherein the user drags the pointer onto at least one additional check box; and means for statefully toggling the status of each additional touch box for which a drag event is detected to the new status of the first check box.

9. The system of claim 6 wherein means for selecting and means for deselecting checkboxes in a GUI according to a mode of operation comprises:

means for detecting a touch event on a first checkbox in the GUI;

means for storing the initial status of all checkboxes in the set;

means for toggling the status of the first checkbox to a new status; and repeatedly, for a multiplicity of repetitions:

means for detecting a drag event for a checkbox onto which a user drags the pointer;

means for comparing the initial status of the checkbox onto which a user drags the pointer and the new status of the first checkbox; and if the stored initial status of a checkbox for which a drag event is detected is the same as the new status of the first checkbox, means for toggling the status of the checkbox for which a drag event is detected.

10. The system of claim 6 wherein each checkbox comprises a drag status indicating whether each checkbox has experienced a drag event and means for selecting and means for deselecting checkboxes in a GUI according to a mode of operation comprises:
- means for detecting a touch event on a first checkbox in the GUI;
- means for toggling the status of the first checkbox to a new status;
- means for setting the drag status of the first checkbox;
- means for detecting first drag events on additional checkboxes onto which a user drags the pointer, including setting a drag status of the additional checkboxes indicating that the additional checkboxes have experienced a drag event;
- means for statefully toggling, to the new selection status of the first checkbox, the status of the additional checkboxes;
- means for detecting subsequent drag events for additional checkboxes onto which a user drags the pointer more than once during a click-and-drag operation, including means for determining in dependence upon the drag statuses of the additional checkboxes whether the additional checkboxes have experienced a drag event; and
- means for statefully toggling the selection status for each additional checkbox for which a subsequent drag event is detected to the opposite of the selection status of such additional checkbox when the additional drag event is detected.

11. A computer program product for control of checkbox status, the computer program product comprising:
- a recording medium;
- means, recorded on the recording medium, for selecting and deselecting checkboxes in a GUI according to a mode of operation, the GUI having displayed upon it a set of checkboxes comprising a multiplicity of checkboxes, wherein each checkbox comprises a selection status indicating whether each checkbox is selected;
- means, recorded on the recording medium, for detecting a mode selection event;
- means, recorded on the recording medium, for changing the mode of operation in dependence upon the detected mode selection event.

12. The computer program product of claim 11 wherein means, recorded on the recording medium, for selecting and means, recorded on the recording medium, for deselecting checkboxes in a GUI according to a mode of operation comprises:
- means, recorded on the recording medium, for detecting a touch event on a check box in the GUI;
- means, recorded on the recording medium, for toggling the status of the check box; and
- repeatedly, for a multiplicity of repetitions:
- means, recorded on the recording medium, for detecting a drag event for each additional check box onto which a user drags the pointer, wherein the user drags the pointer onto at least one additional check box; and
- means, recorded on the recording medium, for toggling the status of each additional touch box for which a drag event is detected.

13. The computer program product of claim 11 wherein means, recorded on the recording medium, for selecting and means, recorded on the recording medium, for deselecting checkboxes in a GUI according to a mode of operation comprises:
- means, recorded on the recording medium, for detecting a touch event on a first check box in the GUI;
- means, recorded on the recording medium, for toggling the status of the first check box to a new status;
- repeatedly, for a multiplicity of repetitions, carrying out:
- means, recorded on the recording medium, for detecting a drag event for each additional check box onto which a user drags the pointer, wherein the user drags the pointer onto at least one additional check box; and
- means, recorded on the recording medium, for statefully toggling the status of each additional touch box for which a drag event is detected to the new status of the first check box.

14. The computer program product of claim 11 wherein means, recorded on the recording medium, for selecting and means, recorded on the recording medium, for deselecting checkboxes in a GUI according to a mode of operation comprises:
- means, recorded on the recording medium, for detecting a touch event on a first checkbox in the GUI;
- means, recorded on the recording medium, for storing the initial status of all checkboxes in the set;
- means, recorded on the recording medium, for toggling the status of the first checkbox to a new status; and
- repeatedly, for a multiplicity of repetitions:
- means, recorded on the recording medium, for detecting a drag event for a checkbox onto which a user drags the pointer;
- means, recorded on the recording medium, for comparing the initial status of the checkbox onto which a user drags the pointer and the new status of the first checkbox; and
- if the stored initial status of a checkbox for which a drag event is detected is the same as the new status of the first checkbox, means, recorded on the recording medium, for toggling the status of the checkbox for which a drag event is detected.

15. The computer program product of claim 11 wherein each checkbox comprises a drag status indicating whether each checkbox has experienced a drag event and means, recorded on the recording medium, for selecting and means, recorded on the recording medium, for deselecting checkboxes in a GUI according to a mode of operation comprises:
- means, recorded on the recording medium, for detecting a touch event on a first checkbox in the GUI;
- means, recorded on the recording medium, for toggling the status of the first checkbox to a new status;
- means, recorded on the recording medium, for setting the drag status of the first checkbox;
- means, recorded on the recording medium, for detecting first drag events on additional checkboxes onto which a user drags the pointer, including setting a drag status of the additional checkboxes indicating that the additional checkboxes have experienced a drag event;
- means, recorded on the recording medium, for statefully toggling, to the new selection status of the first checkbox, the status of the additional checkboxes;
- means, recorded on the recording medium, for detecting subsequent drag events for additional checkboxes onto which a user drags the pointer more than once during a click-and-drag operation, including means, recorded on the recording medium, for determining in dependence upon the drag statuses of the additional checkboxes whether the additional checkboxes have experienced a drag event; and
- means, recorded on the recording medium, for statefully toggling the selection status for each additional checkbox for which a subsequent drag event is detected to the opposite of the selection status of such additional checkbox when the additional drag event is detected.

* * * * *